（12) United States Patent
Pégard et al.

(10) Patent No.: US 12,346,066 B2
(45) Date of Patent: Jul. 1, 2025

(54) HIGH-SPEED COMPUTER GENERATED HOLOGRAPHY USING CONVOLUTIONAL NEURAL NETWORKS

(71) Applicant: The University of North Carolina at Chapel Hill, Chapel Hill, NC (US)

(72) Inventors: Nicolas Christian Richard Pégard, Chapel Hill, NC (US); Mohammad Hossein Eybposh, Chapel Hill, NC (US); Nicholas William Caira, Chapel Hill, NC (US); Mathew Abuya Atisa, Chapel Hill, NC (US); Praneeth Kumar Chakravarthula, Carrboro, NC (US)

(73) Assignee: THE UNIVERSITY OF NORTH CAROLINA AT CHAPEL HILL, Chapel Hill, NC (US)

( * ) Notice: Subject to any disclaimer, the term of this patent is extended or adjusted under 35 U.S.C. 154(b) by 1108 days.

(21) Appl. No.: 17/235,476

(22) Filed: Apr. 20, 2021

(65) Prior Publication Data

US 2021/0326690 A1    Oct. 21, 2021

Related U.S. Application Data

(60) Provisional application No. 63/012,865, filed on Apr. 20, 2020.

(51) Int. Cl.
*G03H 1/00* (2006.01)
*G03H 1/08* (2006.01)
(Continued)

(52) U.S. Cl.
CPC ......... *G03H 1/0808* (2013.01); *G03H 1/2294* (2013.01); *G06F 18/22* (2023.01);
(Continued)

(58) Field of Classification Search
None
See application file for complete search history.

(56) References Cited

U.S. PATENT DOCUMENTS 3,606,515 A      9/1971   Hirsch et al.
6,163,391 A *  12/2000   Curtis ................. G11B 7/1372
(Continued)

FOREIGN PATENT DOCUMENTS

GB        2596393 B     11/2022

OTHER PUBLICATIONS

Notice of Allowance and Fee(s) Due for U.S. Appl. No. 16/710,845 (Aug. 6, 2021).
(Continued)

*Primary Examiner* — Martin Mushambo
(74) *Attorney, Agent, or Firm* — Jenkins, Taylor & Hunt, P.A.

(57) ABSTRACT

The goal of computer generated holography (CGH) is to synthesize custom illumination patterns by shaping the wavefront of a coherent light beam. Existing algorithms for CGH rely on iterative optimization with a fundamental trade-off between hologram fidelity and computation speed, making them inadequate for high-speed holography applications such as optogenetic photostimulation, optical trapping, or virtual reality displays. We propose a new algorithm, DeepCGH, that relies on a convolutional neural network to eliminate iterative exploration and rapidly synthesize high resolution holograms with fixed computational complexity. DeepCGH is an unsupervised model which can be tailored for specific tasks with customizable training data sets and an explicit cost function. Results show that our
(Continued)

method computes 3D holograms at record speeds and with better accuracy than existing techniques.

**21 Claims, 11 Drawing Sheets
(9 of 11 Drawing Sheet(s) Filed in Color)**

(51) Int. Cl.

| | | |
|---|---|---|
| *G03H 1/22* | (2006.01) | |
| *G06F 18/22* | (2023.01) | |
| *G06N 3/02* | (2006.01) | |
| *G06N 3/067* | (2006.01) | |
| *G06N 3/084* | (2023.01) | |
| *G06V 10/44* | (2022.01) | |
| *G06V 10/764* | (2022.01) | |
| *G06V 10/88* | (2022.01) | |
| *G03H 1/02* | (2006.01) | |

(52) U.S. Cl.
CPC ............. *G06N 3/02* (2013.01); *G06N 3/0675* (2013.01); *G06N 3/084* (2013.01); *G06V 10/454* (2022.01); *G06V 10/764* (2022.01); *G06V 10/88* (2022.01); *G03H 2001/0224* (2013.01); *G03H 2225/32* (2013.01)

(56) References Cited

U.S. PATENT DOCUMENTS

| | | | |
|---|---|---|---|
| 11,137,719 B2 | 10/2021 | Chakravarthula et al. | |
| 12,033,066 B2* | 7/2024 | Macfaden | G06N 3/045 |
| 2001/0050787 A1 | 12/2001 | Crossland et al. | |
| 2005/0196035 A1* | 9/2005 | Luo | G06V 10/772 |
| | | | 382/154 |
| 2007/0113012 A1* | 5/2007 | Cable | G03H 1/2286 |
| | | | 711/118 |
| 2009/0297021 A1* | 12/2009 | Islam | G06V 10/898 |
| | | | 382/160 |
| 2011/0157667 A1 | 6/2011 | Lacoste et al. | |
| 2015/0003750 A1* | 1/2015 | Bernal | G06V 10/25 |
| | | | 382/233 |
| 2017/0090418 A1* | 3/2017 | Tsang | G03H 1/0011 |
| 2017/0185037 A1* | 6/2017 | Lee | G03H 1/16 |
| 2017/0220000 A1* | 8/2017 | Ozcan | G03H 1/0866 |
| 2018/0074458 A1* | 3/2018 | Tsang | G03H 1/0866 |
| 2019/0227490 A1* | 7/2019 | Waller | G02B 21/06 |
| 2019/0294106 A1* | 9/2019 | Cheng | G03H 1/0005 |
| 2019/0294108 A1* | 9/2019 | Ozcan | G06V 10/82 |
| 2019/0317451 A1* | 10/2019 | Supikov | G06F 18/214 |
| 2020/0045271 A1* | 2/2020 | Aghayee | G03B 21/208 |
| 2020/0117139 A1* | 4/2020 | Supikov | G03H 1/0402 |
| 2020/0192287 A1* | 6/2020 | Chakravarthula ... | G03H 1/0866 |
| 2021/0173341 A1* | 6/2021 | Collings | G03H 1/2294 |
| 2021/0255488 A1* | 8/2021 | Piestun | G02F 1/0121 |
| 2021/0272005 A1* | 9/2021 | King | G06N 10/70 |
| 2022/0164634 A1* | 5/2022 | Dai | G06N 3/08 |

OTHER PUBLICATIONS

Combined Search and Examination Report under Sections 17 & 18(3) for Great Britain Patent Application Serial No. GB2105628.8 (Oct. 21, 2021).
Notification of Grant for Great Britain Patent Application Serial No. GB2105628.8 (Oct. 27, 2022).
Non-Final Office Action for U.S. Appl. No. 16/710,845 (Apr. 23, 2021).
Applicant-Initiated Interview Summary for U.S. Appl. No. 16/710,845 (Jan. 29, 2021).
Advisory Action for U.S. Appl. No. 16/710,845 (Jan. 27, 2021).
Final Office Action for U.S. Appl. No. 16/710,845 (Oct. 16, 2020).
Non-Final Office Action for U.S. Appl. No. 16/710,845 (Jun. 30, 2020).
Eybposh et al., "DeepCGH: Fast and Accurate 3D Computer Generated Holography with Deep Learning, supplementary material," http://dx.doi.org/10.1364/optica, pp. 1-3 (Apr. 13, 2020).
Wang et al., "Hardware implementations of computer-generated holography: a review," Opt. Eng., vol. 59, No. 10, pp. 1-31 (2020).
Chakravarthula et al., "Computing high quality phase-only holograms for holographic displays," Proc. SPIE, Optical Architectures for Displays and Sensing in Augmented, Virtual, and Mixed Reality (AR, VR, MR), pp. 1-17 (Feb. 21, 2020).
Chakravarthula et al., "Wirtinger Holography for Near-Eye Displays," ACM Trans. Graph., vol. 38, No. 6, pp. 1-13 (Nov. 2019).
Pozzi et al., "Fast Calculation of Computer Generated Holograms for 3D Photostimulation through Compressive-Sensing Gerchberg-Saxton Algorithm," Methods and Protocols, vol. 2, pp. 1-11 (2019).
Xue et al., "Reliable deep-learning-based phase imaging with uncertainty quantification," Optica, vol. 6, No. 5, pp. 618-629 (May 2019).
Rivenson et al., "Deep learning in holograpy and coherent imaging," Light: Science & Applications, vol. 8, No. 85, pp. 1-8 (2019).
Chakravarthula et al., "FocusAR: Auto-focus Augmented Reality Eyeglasses for both Real World and Virtual Imagery," IEEE Transactions on Visualization and Computer Graphics, vol. 24, No. 11, pp. 2906-2916 (Sep. 2018).
Yang et al., "Holographic imaging and photostimulation of neural activity," Science Direct, pp. 1-20 (2018).
Mardinly et al., "Precise multimodal optical control of neural ensemble activity," Nat Neurosci., vol. 21, No. 6, pp. 1-41 (Jun. 2018).
Metzler et al., "prDeep: Robust Phase Retrieval with a Flexible Deep Network," International Conference on Machine Learning, arXiv:1803.00212v2, 10 pages (Jun. 2018).
Rivenson et al., "Phase recovery and holographic image reconstruction using deep learning in neural networks," Light: Science & Applications, vol. 7, pp. 1-9 (2018).
Wu et al., "Extended depth-of-field in holographic imaging using deep-learning-based autofocusing and phase recovery," Optica, vol. 5, No. 6, pp. 704-710 (Jun. 2018).
Goldstein et al., "PhaseMax: Convex Phase Retrieval via Basis Pursuit," IEEE Transactions on Information Theory, arXiv:1610.07531v3, pp. 2675-2689 (Jan. 30, 2018).
Horisaki et al., "Deep-learning-generated holography," Applied Optics, pp. 1-6 (Apr. 12, 2018).
Zhang et al., "The Unreasonable Effectiveness of Deep Features as a Perceptual Metric," The Unreasonable Effectiveness of Deep Features as a Perceptual Metric, pp. 586-595 (2018).
Zhang et al., "Closed-loop all-optical manipulation of neural circuits in in vivo," Nat Methods, vol. 15, No. 12, pp. 1-16 (Dec. 1, 2018).
Cholewiak et al., "ChromaBlur: Rendering Chromatic Eye Aberration Improves Accommodation and Realism," ACM Transactions on Graphics, vol. 36, No. 6, pp. 210:1-210:12 (Nov. 2017).
Pégard et al., "Three-dimensional scanless holographic optogenetics with temporal focusing (3D-SHOT)," Nature Communications, vol. 8, No. 1228, pp. 1-14 (2017).
Häussler et al., "Large real-time holographic 3D displays: enabling components and results," Applied Optics, vol. 56, No. 13, pp. F45-F52 (May 1, 2017).
Häussler et al., "Large holographic 3D display for real-time computer-generated holography," Proc. SPIE, pp. 1-12 (Jun. 26, 2017).
Park, "Recent progress in computer-generated holography for three-dimensional scenes," Journal of Information Display, vol. 18, No. 1, pp. 1-13 (2017).
Peng et al., "Mix-and-match holography," ACM Transactions on Graphics, vol. 36, No. 6, pp. 191:1-191:12 (Nov. 2017).
Shi et al., "Near-eye Light Field Holographic Rendering with Spherical Waves for Wide Field of View Interactive 3D Computer Graphics," ACM Transactions on Graphics, vol. 36, No. 6, pp. 236:1-236:17 (Nov. 2017).
Zhang et al., "3D computer-generated holography by non-convex optimization," Optica, vol. 4, No. 10, pp. 1306-1313 (Oct. 2017).

(56) References Cited

OTHER PUBLICATIONS

Qian et al., "Inexact Alternating Optimization for Phase Retrieval in the Presence of Outliers," IEEE Transactions on Signal Processing, vol. 65, No. 22, pp. 1-14 (Jul. 24, 2017).
Maimone et al., "Holographic Near-Eye Displays for Virtual and Augmented Reality," ACM Transactions on Graphics, vol. 36, No. 4, pp. 85:1-85:16 (Jul. 2017).
Bahmani et al., "Phase Retrieval Meets Statistical Learning Theory: A Flexible Convex Relaxation," arXiv:1610.04210v2, pp. 1-17 (Mar. 16, 2017).
Kim et al., "Perceptual Studies for Foveated Light Field Displays," arXiv:1708.06034v1, 3 pages (Aug. 20, 2017).
Kingma et al., "ADAM: A Method for Stochastic Optimization," arXiv:1412.6980v9, pp. 1-15 (Jan. 30, 2017).
Eybposh et al., "Segmentation and Classification of Cine-MR Images Using Fully Convolutional Networks and Handcrafted Features," CoRR, abs/1709.02565, pp. 1-9 (2017).
Koller, "Optical trapping: Techniques and applications," in Student Research Celebration, (Montana State University, 2017), pp. 1-1.
Abadi et al., "TensorFlow: A System for Large-Scale Machine Learning," 12th USENIX Symposium on Operating Systems Design and Implementation (OSDI), pp. 265-283 (Nov. 2-4, 2016).
Shi et al., "Real-Time Single Image and Video Super-Resolution Using an Efficient Sub-Pixel Convolutional Neural Network," arXiv:1609.05158v2, pp. 1-10 (Sep. 23, 2016).
McHugh, "Head-Tracked Transformations," Humane Virtuality, Head-Tracked Transformations. How do you look behind an object in VR . . . | by Andrew R McHugh | Humane Virtuality | Medium, pp. 1-22 (Aug. 18, 2016).
Abadi et al., "TensorFlow: Large-Scale Machine Learning on Heterogeneous Distributed Systems," arXiv:1603.04467v2, pp. 1-19 (Mar. 16, 2016).
Yoshikawa et al., "Image quality evaluation and control of computer-generated holograms," Proceedings of the Society of Photo-Optical Instrumentation Engineers, vol. 9771, pp. 97710N-1-97710N-9 (Mar. 7, 2016).
Zhang et al., "Layered holographic stereogram based on inverse Fresnel diffraction," Applied Optics, vol. 55, No. 3, pp. A154-A159 (Jan. 20, 2016).
Candès et al., "Phase Retrieval via Wirtinger Flow: Theory and Algorithms," IEEE Transactions on Information Theory, arXiv:1407.1065v3, pp. 1-42 (Nov. 24, 2015).
Zhao et al., "Accurate calculation of computer-generated holograms using angular-spectrum layer-oriented method," Optics Express, vol. 23, No. 20, pp. 25440-25449 (Oct. 5, 2015).
Ioffe et al., "Batch Normalization: Accelerating Deep Network Training by Reducing Internal Covariate Shift," Proceedings of the 32nd International Conference on Machine Learning, pp. 1-9 (2015).
Ronneberger et al., "U-Net: Convolutional Networks for Biomedical Image Segmentation," MICCAI 2015, Part III, LNCS 9351, pp. 1-8 (2015).
Huang et al., "The Light Field Stereoscope: Immersive Computer Graphics via Factored Near-Eye Light Field Displays with Focus Cues," ACM Transactions on Graphics, vol. 34, No. 4, pp. 60:1-60:8 (Aug. 2015).
Chen et al., "Improved layer-based method for rapid hologram generation and real-time interactive holographic display applications," Optics Express, vol. 23, No. 14, pp. 18143-18155 (Jul. 2015).
Marchesini et al., "Alternating projection, ptychographic imaging and phase synchronization," Applied and Computational Harmonic Analysis, arXiv:1402.0550v3, pp. 1-41 (Jul. 20, 2015).
Zhang et al., "Fully computed holographic stereogram based algorithm for computer-generated holograms with accurate depth cues," Optics Express, vol. 23, No. 4, pp. 3901-3913 (Feb. 23, 2015).
Huang et al., "Single Image Super-resolution from Transformed Self-Exemplars," Proceedings of the IEEE Conference on Computer Vision and Pattern Recognition, pp. 5197-5206 (2015).
Jia et al., "Fast and effective occlusion culling for 3D holographic displays by inverse orthographic projection with low angular sampling," Applied Optics, vol. 53, No. 27, pp. 6287-6293 (Sep. 20, 2014).
Matsushima et al., "Silhouette method for hidden surface removal in computer holography and its acceleration using the switch-back technique," Optics Express, vol. 22, No. 20, pp. 24450-24465 (Sep. 2014).
Heide et al., "Cascaded Displays: Spatiotemporal Superresolution using Offset Pixel Layers," ACM Transactions on Graphics (TOG), vol. 33, No. 4 pp. 60:1-60:11 (Jul. 2014).
Okada et al., "Band-limited double-step Fresnel diffraction and its application to computer-generated holograms," Optics Express, vol. 21, No. 7, pp. 9192-9197 (Apr. 8, 2013).
Lanman et al., "Near-Eye Light Field Displays," ACM Transactions on Graphics, vol. 32, No. 6, pp. 220:1-220:10 (2013).
Wen et al., "Alternating Direction Methods for Classical and Ptychographic Phase Retrieval," Inverse Problems, vol. 28, No. 11, pp. 1-18 (Oct. 2012).
Bevilacqua et al., "Low-Complexity Single-Image Super-Resolution based on Nonnegative Neighbor Embedding," In Proceedings British Machine Vision Conference, pp. 1-10 (2012).
Krizhevsky et al., "ImageNet Classification with Deep Convolutional Neural Networks," Advances in Neural Information Processing Systems, pp. 1-9 (2012).
Candès et al., "PhaseLift: Exact and Stable Signal Recovery from Magnitude Measurements via Convex Programming," Communications on Pure and Applied Mathematics, arXiv:1109.4499v1, pp. 1-31 (Sep. 21, 2011).
Demissie, "Performance Predictions for Parameter Estimators that Minimize Cost-Functions Using Wirtinger Calculus With Application to CM Blind Equalization," IEEE Transactions on Signal Processing, vol. 59, No. 8, pp. 3685-3698 (Aug. 2011).
Bayraktar et al., "Method to calculate the far field of three-dimensional objects for computer-generated holography," Applied Optics, vol. 49, No. 24, pp. 4647-4654 (Aug. 20, 2010).
Smithwick et al., "Interactive Holographic Stereograms with Accommodation Cues," Proceedings of the Society of Photo-Optical Instrumentation Engineers, vol. 7619, pp. 761903:1-761903:13 (Feb. 2010).
Zeyde et al., "On Single Image Scale-up using Sparse-Representations," International Conference on Curves and Surfaces, pp. 1-20 (2010).
Chen et al., "Computer generated hologram from point cloud using graphics processor," Applied Optics, vol. 48, No. 36, pp. 6841-6850 (Dec. 20, 2009).
Matsushima et al., "Extremely high-definition full-parallax computer-generated hologram created by the polygon-based method," Applied Optics, vol. 48, No. 34, pp. H54-H63 (Dec. 1, 2009).
Matsushima et al., "Band-Limited Angular Spectrum Method for Numerical Simulation of Free-Space Propagation in Far and Near Fields," Optics Express, vol. 17, No. 22, pp. 19662-19673 (Oct. 26, 2009).
Kim et al., "Mathematical modeling of triangle-mesh-modeled three-dimensional surface objects for digital holography," Applied Optics, vol. 47, No. 19, pp. D117-D127 (Jul. 1, 2008).
Ahrenberg et al., "Computer generated holograms from three dimensional meshes using an analytic light transport model," Applied Optics, vol. 47, No. 10, pp. 1567-1574 (Apr. 1, 2008).
Shen et al., "Fast-Fourier-transform based numerical integration method for the Rayleigh-Sommerfeld diffraction formula," Applied Optics, vol. 45, No. 6, pp. 1102-1110 (Feb. 20, 2006).
Masuda et al., "Computer generated holography using a graphics processing unit," Optics Express, vol. 14, No. 2, pp. 603-608 (Jan. 2006).
Matsushima, "Computer-generated holograms for three-dimensional surface objects with shade and texture," Applied Optics, vol. 44, No. 22, pp. 4607-4614 (Aug. 1, 2005).
Luke, "Relaxed averaged alternating reflections for diffraction imaging," Inverse Problems, vol. 21, No. 1, pp. 37-50 (2005).
Schmidt, "minFunc: unconstrained differentiable multivariate optimization in Matlab," https://www.cs.ubc.ca/~schmidtm/Software/minFunc.html, pp. 1-6 (2005).

(56) References Cited

OTHER PUBLICATIONS

Neuman et al., "Optical trapping," Rev Sci Instrum., vol. 75, No. 9, pp. 1-46 (Sep. 2004).
Bauschke et al., "Hybrid Projection-Reflection Method for Phase Retrieval," Journal of the Optical Society of America A (JOSA A), vol. 20, No. 6, pp. 1-28 (2003).
Petz et al., "Fast Hologram Synthesis for 3D Geometry Models using Graphics Hardware," Proceedings of the Society of Photo-Optical Instrumentation Engineers (SPIE), vol. 5005, pp. 266-275 (2003).
Wang et al., "Multi-scale structural similarity for image quality assessment," Proceedings of the 27th IEEE Asilomar Conference on Signals, Systems, and Computers, pp. 1398-1402 (2003).
Martin et al., "A database of human segmented natural images and its application to evaluating segmentation algorithms and measuring ecological statistics," Proceedings of the 8th International Conference on Computer Vision, vol. 2, pp. 416-423 (2001).
Piestun et al., "Wave fields in three dimensions: analysis and synthesis," J. Opt. Soc. Am. A, vol. 13, No. 9, pp. 1837-1848 (Sep. 1996).
Lucente et al., "Rendering Interactive Holographic Images," Proceedings of the 22nd Annual Conference on Computer Graphics and Interactive Techniques, pp. 387-394 (Sep. 1995).
Yamaguchi et al., "Phase-added stereogram: calculation of hologram using computer graphics technique," Proceedings of the Society of Photo-Optical Instrumentation Engineers, vol. 1914, pp. 25-31 (Sep. 17, 1993).
Fienup, "Phase-retrieval algorithms for a complicated optical system," Applied Optics, vol. 32, No. 10, pp. 1737-1746 (Apr. 1, 1993).
Tommasi et al., "Computer-generated holograms of tilted planes by a spatial frequency approach," Journal of the Optical Society of America A, vol. 10, No. 2, pp. 299-305 (Feb. 1993).
Lucente, "Interactive Computation of Holograms Using a Look-up Table," Journal of Electronic Imaging, vol. 2, No. 1, pp. 28-34 (Jan. 1993).
Underkoffler, "Toward Accurate Computation of Optically Reconstructed Holograms," Ph.D. Dissertation, Massachusetts Institute of Technology, pp. 1-165 (Jun. 1991).
Lane, "Phase Retrieval Using Conjugate Gradient Minimization," Journal of Modern Optics, vol. 38, No. 9, pp. 1797-1813 (1991).
Liu et al., "On the limited memory BFGS method for large scale optimization," Mathematical Programming, vol. 45, No. 1-3, pp. 1-26 (1989).
Leseberg, "Computer-generated three-dimensional image holograms," Applied Optics, vol. 31, No. 2, pp. 223-229 (Jan. 10, 1992).
Leseberg et al., "Computer-generated holograms of 3-D objects composed of tilted planar segments," Applied Optics, vol. 27, No. 14, pp. 3020-3024 (Jul. 15, 1988).
Fienup, "Phase retrieval algorithms: a comparison," Applied Optics, vol. 21, No. 15, pp. 2758-2769 (Aug. 1, 1982).
Bates, "Fourier phase problems are uniquely solvable in mute than one dimension," I: Underlying Theory, Optik, vol. 61, No. 3, pp. 247-262 (1982).
Hsueh et al., "Computer-generated double-phase holograms," Applied Optics, vol. 17, No. 24, pp. 3874-3883 (Dec. 15, 1978).
Gonsalves, "Phase retrieval from modulus data," Journal of the Optical Society of America, vol. 66, No. 9, pp. 961-964 (Sep. 1976).
Gerchberg et al., "A Practical Algorithm for the Determination of Phase from Image and Diffraction Plane Pictures," Optik, vol. 35, No. 2, pp. 237-246 (Nov. 1972).
Gerchberg et al., "A Practical Algorithm for the Determination of Phase from Image and Diffraction Plane Pictures," Optik, vol. 35, No. 2, pp. 237-246 (1972).
Lesem et al., "The Kinoform: A New Wavefront Reconstruction Device," IBM Journal of Research and Development, vol. 13, No. 2, pp. 150-155 (Mar. 1969).
Waters, "Holographic image synthesis utilizing theoretical methods," Applied Physics Letters, vol. 9, No. 11, pp. 405-407 (Dec. 1, 1966).
Wirtinger, "On the formal theory of the functions of more complex versions," Mathematical Annals, vol. 97, No. 1, pp. 357-375 (1927).
Notice of Publication for Great Britain Patent Application Serial No. GB2105628.8 (Nov. 29, 2021).

* cited by examiner

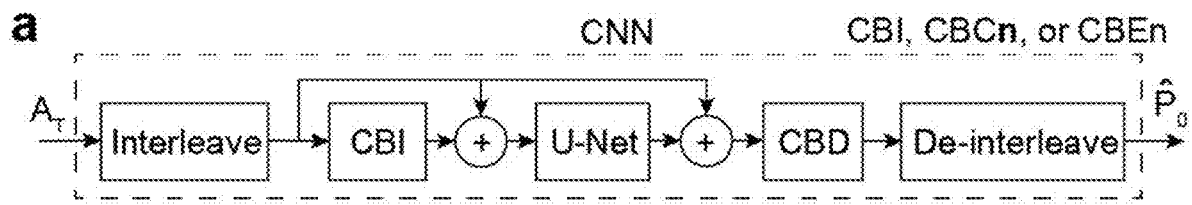
*FIG. 2A*
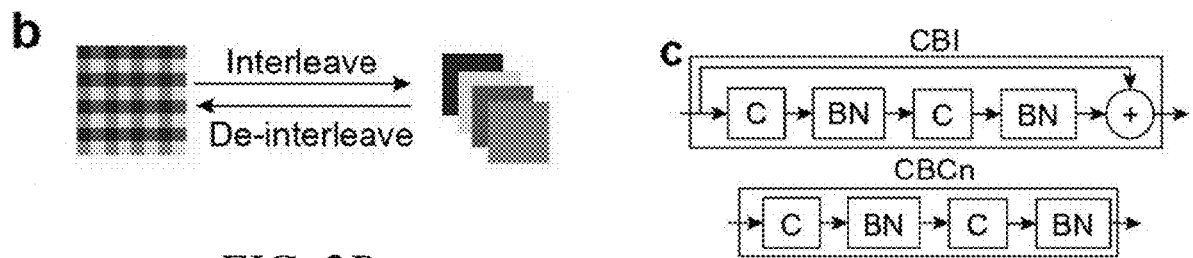
*FIG. 2B*
*FIG. 2C*
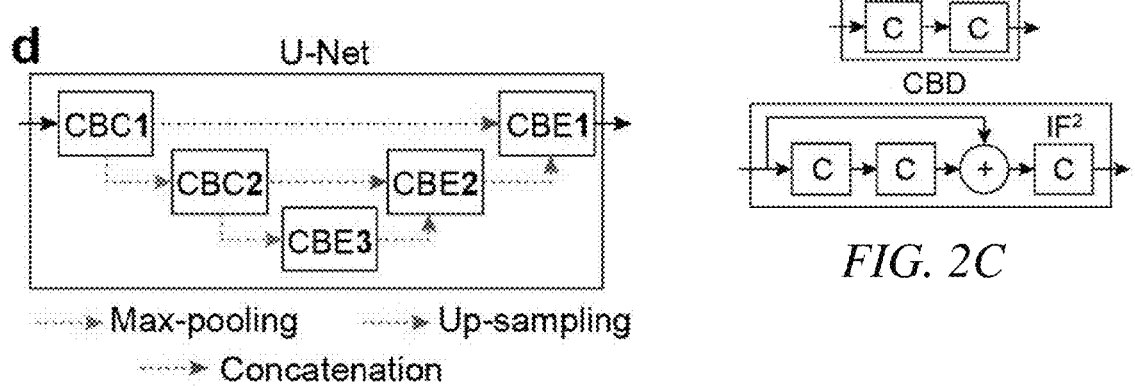
*FIG. 2D*

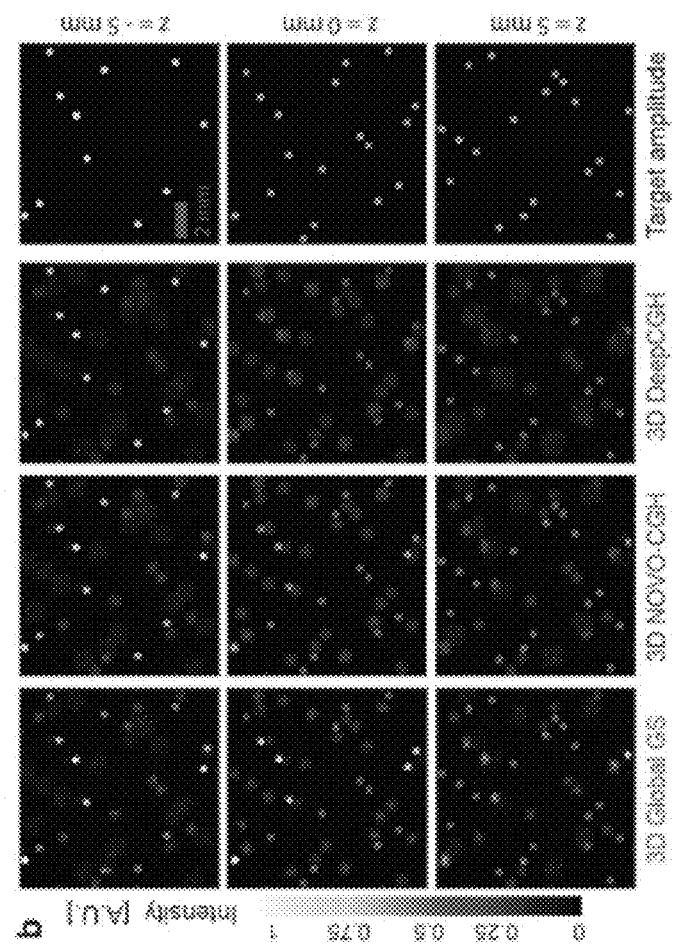
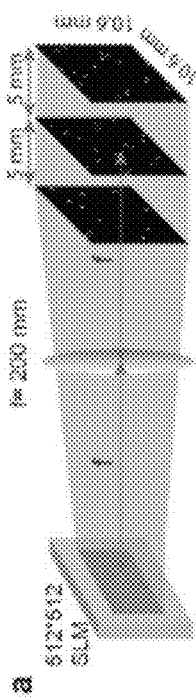
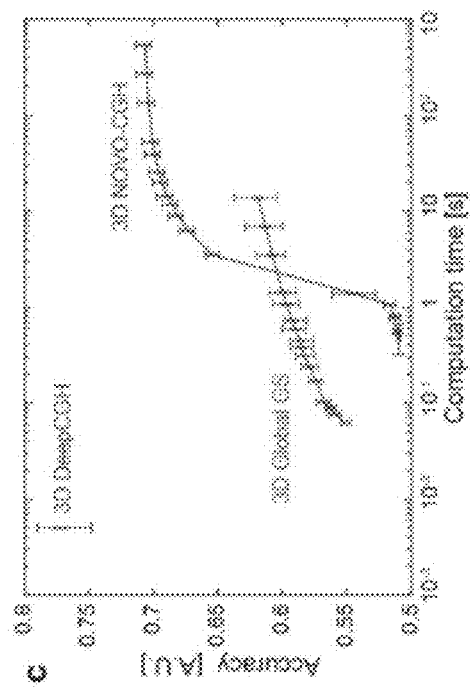
FIG. 4A
FIG. 4B
FIG. 4C

HIGH-SPEED COMPUTER GENERATED HOLOGRAPHY USING CONVOLUTIONAL NEURAL NETWORKS

RELATED APPLICATIONS

This application claims the priority benefit of U.S. Provisional Patent Application Ser. No. 63/012,865, filed Apr. 20, 2020, the disclosure of which is incorporated herein by reference in its entirety.

TECHNICAL FIELD

The subject matter described herein relates to computer generated holography. More particularly, the subject matter described herein relates to high speed computer generated holography using convolutional neural networks.

BACKGROUND

The goal of computer generated holography is to generate a desired illumination pattern in two or three dimensions by modulating light waves from a coherent light source, such as a laser beam, using a configurable spatial light modulator (SLM). The SLM applies phase modulation to light from the laser beam. The light output from the spatial light modulator is shifted in phase based on the configurable phase pattern of the SLM. The light propagates through an optical system and generates a custom illumination pattern or hologram at the image plane. Solving for the phase pattern at the SLM to produce the desired illumination pattern is a complex problem with no exact solution.

Conventional solutions to the computer generated holography problem are sub-optimal because they require multiple iterations to determine a suitable SLM mask even after the neural networks used in such methods are trained. In some CGH applications, such as virtual and augmented reality headsets, neural photostimulation, and optical trapping, it is desirable to produce 3D holograms in real time. For example, in virtual reality headsets, the required rate on hologram generation on the order of 140 Hz. In optogenetics, the required rate of hologram generation may be at or near the speed of biological processes, which can be on the order of 1000 Hz. In some conventional CGH systems, the time to compute a suitable SLM phase mask is on the order of 100 or more milliseconds, which is unsuitable for real time computer generated holography applications.

Accordingly, in light of these difficulties, there exists a need for improved computer generated holography using convolutional neural networks.

SUMMARY

A method for computer-generated holography includes providing a target holographic image illumination distribution as input to a trained convolutional neural network (CNN). The method further includes generating, using the trained CNN, a predicted complex optical field in an image plane located downstream along an optical axis from a spatial light modulator; back propagating the complex optical field to a spatial light modulator plane to yield a predicted spatial light modulator phase mask. The method further includes configuring the spatial light modulator using the predicted spatial light modulator phase mask. The method further includes passing incident light through the configured spatial light modulator to produce a holographic image.

According to another aspect of the subject matter described herein, the target holographic image illumination distribution comprises a three dimensional (3D) illumination distribution and wherein the holographic image comprises a 3D holographic image.

According to another aspect of the subject matter described herein, the target holographic image illumination distribution comprises a two dimensional (2D) illumination distribution and wherein the holographic image comprises a 2D holographic image.

According to another aspect of the subject matter described herein, providing the target holographic image illumination distribution as input to the trained CNN includes interleaving different target holographic images and providing the interleaved images as input to the trained CNN.

According to another aspect of the subject matter described herein, generating the predicted complex optical field in the image plane located downstream from the spatial light modulator includes generating the predicted complex optical field in an image plane located within a target image volume.

According to another aspect of the subject matter described herein, back propagating the complex optical field to the spatial light modulator plane includes computing a near field wave propagation of the complex optical field.

According to another aspect of the subject matter described herein, computing the near field wave propagation of the complex optical field includes computing the near field wave propagation using the following equation for Fresnel propagation:

$$P_z(x, y) = \int\int \frac{P_0(x', y')}{\sqrt{i\lambda z}} \exp\left[\frac{i\pi((x-x')^2 + (y-y')^2)}{\lambda z}\right] dx' dy',$$

where $P_z(x,y)$ is the complex optical field at any location z along the optical axis, x and y are dimensions of the complex optical field along axes transverse to the optical axis, $P_0(x', y')$ is the complex optical field at the image plane, x' and y' are dimensions of the complex optical field along the axes transverse to the optical path in the image plane, $\lambda$ is a wavelength of the incident light.

According to another aspect of the subject matter described herein, the CNN is trained using target holographic image illumination distributions as input to produce estimated complex optical fields as output.

According to another aspect of the subject matter described herein, the CNN is trained using a user-specified cost function that measures dissimilarity between target holographic image illumination distributions and simulation results.

According to another aspect of the subject matter described herein, a method for training a convolutional neural network for computer generated holography is disclosed. The method includes providing a target holographic image illumination distribution as input to a convolutional neural network (CNN). The method further includes generating, using the CNN, a predicted complex optical field in an image plane located downstream along optical axis from a spatial light modulator (SLM). The method further includes back propagating the predicted complex optical field to spatial light modulator plane to yield predicted spatial light modulator phase mask. The method further includes simulating forward propagation of a simulated light field through a simulated SLM configured with the predicted SLM phase mask and simulated optics to produce reconstructed target image distribution. The method further includes evaluating the predicted SLM phase mask using a cost function that generates values based on a comparison between the reconstructed target image distribution and the target holographic image illumination distribution input to the CNN. The method further includes providing the values of the cost function and different desired target holographic image illumination distributions as inputs to the CNN, wherein the CNN adjusts its parameters to achieve a desired value or range of values of the cost function.

According to another aspect of the subject matter described herein, a system for computer-generated holography is provided. The system includes a configurable spatial light modulator (SLM) for modulating an incident light beam. The system further includes a trained convolutional neural network for receiving, as input, a target holographic image illumination distribution and for generating a predicted complex optical field in an image plane located downstream along an optical axis from the SLM. The system further includes an optical field back propagation module for back propagating the complex optical field to a spatial light modulator plane to yield a predicted spatial light modulator phase mask. The system further includes an SLM configuration module for configuring the spatial light modulator using the phase mask to modulate the incident light beam and produce a holographic image.

According to another aspect of the subject matter described herein, the CNN is configured to receive interleaved target holographic image illumination distributions.

According to another aspect of the subject matter described herein, the CNN is configured to generate the predicted complex optical field in an image plane located within a target image volume.

According to another aspect of the subject matter described herein, the back propagation module is configured to compute a near field wave propagation of the complex optical field.

According to another aspect of the subject matter described herein, the back propagation module is configured to compute near field wave propagation of the complex optical field using the following equation for Fresnel propagation:

$$P_z(x, y) = \int\int \frac{P_0(x', y')}{\sqrt{i\lambda z}} \exp\left[\frac{i\pi((x-x')^2 + (y-y')^2)}{\lambda z}\right] dx' dy',$$

where $P_z(x,y)$ is the complex optical field at any location z along the optical axis, x and y are dimensions of the complex optical field along axes transverse to the optical axis, $P_0(x', y')$ is the complex optical field at the image plane, x' and y' are dimensions of the complex optical field along the axes transverse to the optical path in the image plane, $\lambda$ is a wavelength of the incident light.

According to another aspect of the subject matter described herein, wherein the CNN is trained using target holographic image illumination distributions as input to produce estimated complex optical fields as output. The system of claim 11 the CNN is trained using a user-specified cost function, such as efficacy or accuracy, that measures dissimilarity between target holographic image illumination distributions and simulation results According to another aspect of the subject matter described herein, a non-transitory computer readable medium having stored thereon executable instructions that when executed by a processor of a computer control the computer to perform steps is provided. The steps include providing a target holographic image illumination distribution as input to a trained convolutional neural network (CNN). The steps further include generating, using the trained CNN, a predicted complex optical field in an image plane located downstream along an optical axis from a spatial light modulator. The steps further include back propagating the complex optical field to a spatial light modulator plane to yield a predicted spatial light modulator phase mask. The steps further include configuring the spatial light modulator using the phase mask so that the spatial light modulator will modulate incident light using the phase mask and produce a holographic image.

According to another aspect of the subject matter described herein, a non-transitory computer readable medium having stored thereon executable instructions that when executed by a processor of a computer control the computer to perform steps is provided. The steps include providing a target holographic image illumination distribution as input to convolutional neural network (CNN). The steps further include generating, using the CNN, a predicted complex optical field in an image plane located downstream along optical axis from a spatial light modulator (SLM). The steps further include back propagating the predicted complex optical field to spatial light modulator plane to yield predicted spatial light modulator phase mask. The steps further include simulating forward propagation of a simulated light field through a simulated SLM configured with the predicted SLM phase mask and simulated optics to produce reconstructed target image distribution. The steps further include evaluating the predicted SLM phase mask using a cost function that generates values based on a comparison between the reconstructed target image distribution and the target holographic image illumination distribution input to the CNN. The steps further include providing the values of the cost function and different desired target holographic image illumination distributions as feedback to the CNN, wherein the CNN adjusts its parameters to achieve a desired value or range of values of the cost function.

The subject matter described herein may be implemented in hardware, software, firmware, or any combination thereof. As such, the terms "function" "node" or "module" as used herein refer to hardware, which may also include software and/or firmware components, for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The subject matter described herein will now be explained with reference to the accompanying drawings of which:

FIGS. 2A-2D are diagrams illustrating implementation details of the convolutional neural network of FIG. 1B;

FIG. 3A illustrates Example 2D target intensity, $|A_T|^2$, with randomly distributed disks, computed phase mask, $\phi_{SLM}$, and retrieved intensity pattern, $|A_R|^2$ (m=256 pixels). FIG. 3B illustrates Accuracy of the reconstructed intensity patterns (resolution=1024 pixels) as a function of the computation time needed to generate the phase masks. All methods are tested on 1000 samples. The accuracy of GS and NOVO-CGH is shown as a function of an increasing number of iterations (up to 3500), shown with separate boxplots to show quartiles. FIG. 3C illustrates sample-wise computation time for DeepCGH at different hologram resolutions, (m). DeepCGH can generate 2048×2048 holograms at 64 frames/second on average. FIG. 3D illustrates DeepCGH speed performance factor, measured by dividing the computation time, T, required for GS and NOVO-CGH to match the accuracy of DeepCGH to the computation time of our method, $T_{DeepCGH}$. FIG. 3E illustrates maximal achievable accuracy of DeepCGH, GS, and NOVO-CGH for 2D binary holography at different resolutions;

FIGS. 4A-4C illustrates results for 3D binary hologram synthesis comparing DeepCGH with GS and NOVO-CGH for hologram size with m=512 and p=3. FIG. 4A illustrates experimental parameters with the 3D volume of interest divided into three adjacent planes. FIG. 4B illustrates example target intensity and matched hologram reconstructions for GS, NOVO-CGH, and our method shown at the sectional planes that define the volume sampling. FIG. 4C illustrates average accuracy of the reconstructed intensity pattern as a function of the computation time to generate phase masks. All methods are tested on 100 samples. The accuracy and speed of iterative methods is shown for up to 3500 iterations;

FIG. 5A illustrates an example of 3D target intensity, $|A_T|^2$, with size m=512 at a defocusing distance z=−15 mm from the focal point and corresponding simulation results for DeepCGH $512^2*7(I)$ and other methods. FIG. 5B illustrates accuracy of the simulated intensity pattern as a function of computation time to generate the phase masks. $512^2*7(I)$ and $512^2*7(II)$ represent DeepCGH results on square holograms with edge size m=512 and 7 depth planes for two different CNN configurations, as summarized in Table 1. $1024^2*11$ represents DeepCGH for hologram size m=1024 and 11 depth planes. DeepCGH, GS, and NOVO-CGH are tested on 100 samples. The accuracy of GS and NOVO-CGH is shown for different number of iterations, ranging from 1 to 3500;

FIGS. 8A, 8B, 8C, 8D, and 8E respectively show the accuracy as a function of computation time for square holograms with edge size 128, 256, 512, 1024, and 2048;

FIG. 9A illustrates example target intensity pattern, and reconstructed intensity patterns for Gerchberg-Saxton (GS), NOVO-CGH, and DeepCGH. FIG. 9B illustrates accuracy of the simulated intensity pattern as a function of computation time needed to generate the phase masks. GS, NOVO-CGH, and DeepCGH, are tested on 1000 samples. The accuracy of GS and NOVO-CGH is shown for an increasing number of iterations in separate boxplots, for up to 3500 iterations;

DETAILED DESCRIPTION

1. Introduction

Figure 1A:
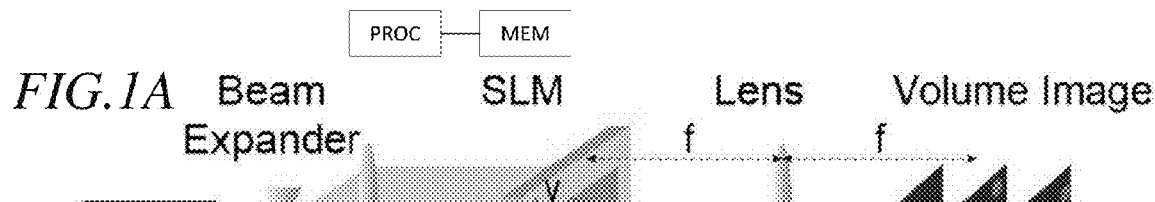
FIGS. 1A and 1B illustrate computer generated holography using indirect computation of the SLM phase mask by reverse propagation of an estimated complex optical field and unsupervised training of a CNN using a cost function according to the subject matter described herein.

Computer generated holography (CGH) aims to synthesize custom light intensity distributions by modulating a coherent wavefront, typically by shaping its phase with a spatial light modulator (SLM). CGH is the preferred method to create custom volumetric illumination in a broad range of applications including optical trapping [1, 2], neural photostimulation [3-5], and 3D displays [6, 7].

Identifying the optimal wave modulation for a hologram to match a target illumination distribution is a multidimensional, nonlinear, and non-convex problem that is generally ill-posed, because most target intensity distributions are physically infeasible and cannot be rendered exactly. Common limitations preventing holograms to be feasible include the numerical aperture of the optical system which limits the maximal allowable resolution, and SLMs that only modulate the wavefront with a finite number of pixels. The issue of hologram feasibility is especially noteworthy in 3D where the target illumination distributions are almost never free-space solutions of the wave propagation equation, and thus cannot be synthesized, even with ideal optical hardware. In practice, CGH solutions are always approximate and numerical methods are required to identify a feasible hologram best matching the desired illumination pattern.

Aside from simple holographic superposition techniques [8], existing methods for CGH rely on iterative exploration. The most common approach is the Gerchberg-Saxton algorithm [9] intensity distribution is rendered, and the SLM plane, where the wavefront is modulated, while enforcing amplitude constraints at each step. This algorithm is easy to implement, yet yields sub-optimal solutions. More recently, advanced algorithms have been developed that compute holograms by solving an optimization problem with an explicit cost function. This includes non-convex optimization with a gradient descent [10], as well as methods based on Wirtinger derivatives that redefine CGH as a quadratic problem which can be minimized with first-order optimization [11, 12]. Both approaches significantly improve exploration and yield better solutions, but further increase the computation time.

Existing algorithms are unfit to address a growing demand for optical instruments capable of synthesizing high resolution holograms in a short time window. Applications where speed is critical include compensating for head motion in virtual reality headsets [11] and brain-machine interfacing tasks with holographic optogenetic microscopy [3,13] where specific neuron ensembles must be stimulated in response to an online observation of animal behavior or neural activity [14].

Current strategies to accelerate hologram computation include optimizing hardware implementation [15] and compressed sensing approaches that reduce computation to smaller regions of interest [16] when the target intensity patterns are spatially sparse. Nonetheless, current methods rely on repeated iterations to achieve acceptable CGH quality and are unable to synthesize high quality holograms in a short predefined time window.

Machine learning models such as convolutional neural networks (CNNs) are powerful tools to model and compute highly non-linear mappings in constant computation time and therefore are excellent candidates for fast CGH. CNNs have been implemented to directly map target intensity patterns to phase masks at the SLM and can synthesize low resolution (64×64 pixels) holograms [17]. We empirically found that this approach does not scale well to higher resolution and 3D CGH. We believe that the limitations of this phase retrieval method is twofold. First, the model is trained using a dataset made of random SLM phase masks (CNN outputs), paired with the corresponding amplitude pattern (CNN input) they yield after forward wave propagation to the image plane. This supervised approach restricts training to random and feasible target intensity distributions and does not train the model to identify approximate solutions for any of the infeasible patterns that are relevant to real-world applications. Second, convolutional layers in CNNs operate across the spatial dimensions of the input data and are best suited to model and compute mappings that preserve some spatial correspondence between input and output. When a CNN is implemented to map an illumination pattern defined in the image plane to SLM phase in the Fourier domain, spatial correspondence is not preserved, and the CNN capabilities are underutilized.

Since holograms are synthesized with coherent electromagnetic waves, the Huygens-Fresnel principle [18] determines how a wave defined by amplitude and phase in any given 2D plane propagates to the rest of the 3D volume. It is, therefore, possible to compute phase information at the SLM indirectly by estimating the phase and amplitude of the reconstructed field anywhere else along the optical axis. A natural approach for CGH with deep learning is to estimate the hologram "in-place" by inferring phase and amplitude at the image plane in z=0. This approach best leverages the abilities of CNNs for spatial feature learning. In-place field estimation using CNNs has already been successfully implemented with supervised learning for applications in imaging to retrieve phase information with coded illumination [19], and from intensity-only recordings of out-of-focus images [20-22].

We introduce DeepCGH, a new algorithm for synthesizing holograms with in-place computation and unsupervised training. Our method relies on a CNN to first infer the complex field of a feasible hologram that best fits the desired illumination pattern at the image plane. The desired output, phase at the SLM plane, is obtained indirectly by simulating the reverse propagation of the wave to the Fourier domain. For any input target holographic image illumination distribution, our algorithm computes a virtual reconstruction of the hologram in the entire volume by simulating the forward propagation of the wavefront at the SLM plane. The CNN parameters are optimized during an initial training step by comparing the reconstructed holograms to the input distribution with an explicit cost function, enabling unsupervised learning with customizable training data sets.

In section 2, we introduce the experimental configuration for DeepCGH, the CNN structure, and our strategy for unsupervised training. In section 3, we compare DeepCGH to existing algorithms in terms of speed and accuracy. Results of this comparison indicate that our method considerably accelerates computation speed for a broad range of hologram resolutions up to 4 Megapixels. In 3D applications, DeepCGH also outperforms the current state of the art and yields holograms with superior accuracy than existing algorithms. Additional results and algorithm implementation details are provided in the second below entitled Supplementary Material.

2. Methods 2.1. Experimental Configuration

We show our experimental setup in FIG. 1A. A collimated laser beam propagating along the optical axis, z, illuminates the active surface of a SLM placed in the pupil plane of a single lens with a static amplitude profile $A_S(x, y)$. A computer controlling the SLM applies a custom phase pattern $\phi_{SLM}(x, y)$ and the modulated wave $P_{SLM}=A_s e^{i\phi_{SLM}}$ propagates to the other side of the lens to yield a volumetric complex field $P(x, y, z)$. in real space. The complex field is discretized in a series of adjacent planes at predetermined depths, (e.g. $P_0$, $P_{-z}$, and $P_z$ in FIGS. 1A and 1B), therefore the volume is defined as m×m×p pixels where m is the edge length of the square hologram and p is the number of planes defining the volume. $P_0(x, y)$ represents the complex field at the image plane, at z=0, at a focal distance, f, from the lens. The relationship between $P_{SLM}$ and $P_0$ is known as an "optical Fourier transform" (FT) and is expressed using the Fraunhofer wave propagation model:

$$P_0(x, y) = \frac{1}{i\lambda f} \int \int p_{SLM}(x', y') \exp\left[\frac{2i\pi(xx' + yy')}{\lambda f}\right] dx' dy'. \quad (1)$$

The complex field $P_0(x,y)$ can be propagated to any depth, z, using Fresnel propagation:

$$P_z(x, y) = \int \int \frac{P_0(x', y')}{\sqrt{i\lambda z}} \exp\left[\frac{i\pi((x - x')^2 + (y - y')^2)}{\lambda z}\right] dx' dy'. \quad (2)$$

The SLM pixel size, ps, the wavelength $\Delta$, and the focal length of the lens, f, determine the span, L=$\lambda$f/ps, of the addressable window in the (x, y) domain. In this configuration, the task of a CGH algorithm is to identify which phase modulation, $\phi_{SLM}$, must be applied so that the resulting 3D intensity distribution, $\|P(x, y, z)\|^2$, best matches a given target intensity distribution input, $\|A_T(x, y, z)\|^2$, as specified by the user. Although our method can be implemented with any holographic setup, this configuration, known as Fourier holography, is the most commonly used method, allowing us to compare our technique with other CGH algorithms independently of any implementation related limitations.

2.2. DeepCGH Algorithm

Figure 1B:
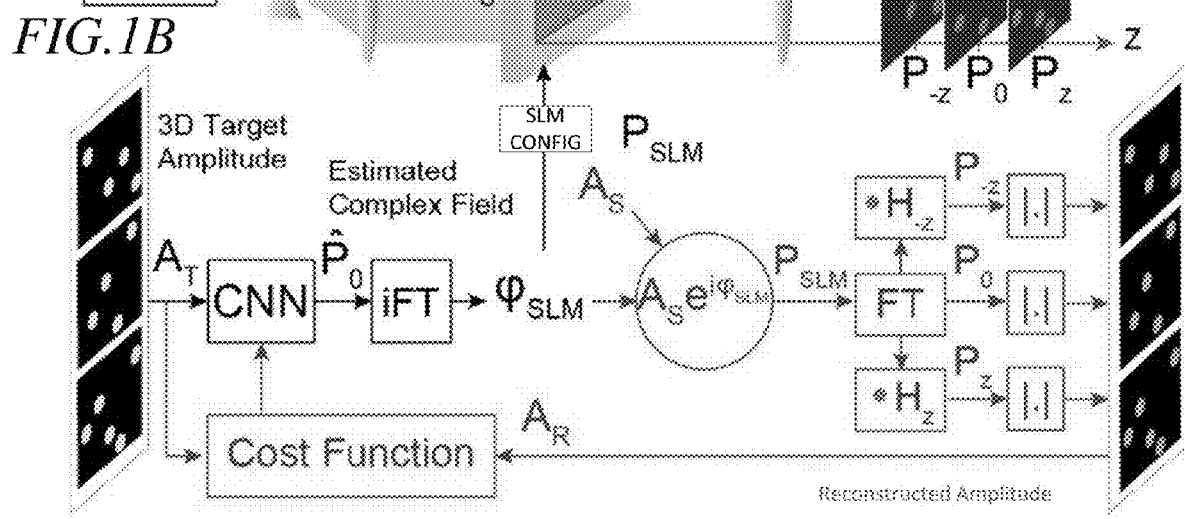

Our algorithm is shown in FIG. 1B. A CNN first performs in-place holography by mapping the target amplitude, $A_T$, to a feasible hologram that is entirely determined by its phase and amplitude $\hat{P}_0 = \hat{A}_0 \exp^{i\hat{\varphi}_0}$ at z=0. With this operation, the input and output of the CNN share significant spatial correspondence, which simplifies the mapping that the CNN performs and facilitates training [23]. For 3D target amplitudes, $A_T$ is fed to the model as a multi-channel image, where the channels are depth planes, m.

The estimated field, $\hat{P}_0$, is reverse propagated to the SLM plane with an inverse 2D Fourier transform (from Eq. 1, labelled "iFT" in FIG. 1B) to yield the desired solution: the predicted phase mask at the SLM plane $\varphi_{SLM}$. During operation, this two-step sequence enables fast computation of the hologram in a fixed, predictable time window.

The block labeled iFT in FIG. 1B can be considered a back propagation module, since the function of the block labeled iFT in FIG. 1B is to back propagate (i.e., in the opposite direction of the forward optical path) the complex optical field at the image plane to the complex optical field at the SLM plane and yield the predicted phase mask for the SLM. The predicted phase mask is used to configure the SLM so that when incident light passes through the SLM, a holographic image is produced. An SLM configuration module (SLM CONFIG in FIG. 1A) may be used to configure the SLM based on the predicted SLM phase pattern output from the back propagation module. The components illustrated in FIGS. 1A and 1B (other than the laser, the lenses, the beam expander, and the SLM may be implemented using at least one processor (labeled PROC in FIG. 1A) and associated memory (labeled MEM in FIG. 1A).

To train the CNN (see FIG. 1B in red), without explicitly providing the optimal solution for $\varphi_{SLM}$ (i.e. unsupervised training), we pair $\varphi_{SLM}$ with the amplitude of the coherent light source, $A_s$, to simulate the complex field that will be synthesized at the SLM plane, $P_{SLM} = A_s e^{i\varphi_{SLM}}$. We virtually propagate the resulting wave to the image plane at z=0 via a FT (Eq. 1) and then again to each plane in the discretized volume, with Eq. 2. This simulation estimates the reconstructed amplitude, $A_R$ (x, y, z), from the DeepCGH output, $\varphi_{SLM}$. By quantifying the mismatch between each target, $A_T$, and its matched reconstruction, $A_R$, with an explicitly defined cost function, we obtain the necessary feedback to update the parameters of the CNN during training.

For 2D holography, our model is reduced to a single plane at z=0 and does not require secondary plane-to-plane propagation using Eq. 2. In this case, it is possible to further simplify our model by only inferring the phase at z=0 via the CNN, i.e. $\hat{\varphi}_0$. In the simplified model (see FIGS. 9A and 9B), we assume that the estimated amplitude is exactly equal to the target amplitude, $A_T$, and the estimated complex field at z=0 becomes $\hat{P}_0 = A_T e^{i\hat{\varphi}_0}$. This strategy, referred to as "phase inference", is only applicable to 2D CGH and reduces the size of the CNN, which further accelerates the computation speed.

2.3. CNN Structure

The CNN structure, shown in FIG. 2A, is made of five modules operating in series. Details of each of the modules are shown in FIG. 2C. The core of the CNN is a U-Net model [24] with several convolutional layers that account for a major portion of the computation requirements.

The first step of the CNN is an interleaving module [25], that rearranges the raw target amplitude pattern $A_T$ with size m×m×p pixels into multiple channels with smaller spatial dimensions (see FIG. 2B). Interleaving is a loss-free transformation that preserves the number of pixels. In the rearranged tensor, each channel consists of a periodic sampling of pixels from the input that are separated by a specific distance, termed interleaving factor (IF), along the (x, y) spatial dimensions. The interleaved tensor has $IF^2 \times p$ channels with spatial dimensions m/IF×m/IF. In the illustrative example shown in FIG. 2B, p=1, IF=2 and the rearranged output has four channels.

We employ interleaving to accelerate DeepCGH with large input data sets (e.g. high resolution, increased field of view, or 3D CGH). Since the U-Net's computation time is linearly proportional to the size of the U-Net input, the smaller spatial dimension of the rearranged data significantly reduces the computation time of the CNN.

Another advantage of interleaving is increased model flexibility. As we increase the image size, the IF is proportionally increased to maintain a fixed spatial dimension in the rearranged image in the output of the module. The number of channels in the rearranged tensor increases quadratically with IF, which in turn affects the computation time of the first convolutional layer. In our implementation, we separate the first convolutional block from the rest of U-Net so that the input data to the U-Net model retains fixed dimensions.

The convolutional block for interleaving (CBI, see FIG. 2C) consists of two convolutional layers (labeled "C"), followed by batch-normalization layers (labeled "BN") [26]. The kernel size for all convolutional layers in the model is set to 3×3 with one pixel overlap (stride 1). The number of kernels for the convolutional layers in this module is fixed at 64 and 128 for all 2D and 3D experiments, respectively.

The convolutional block for de-interleaving (CBD, see FIG. 2C) prepares the data tensor for the de-interleave module. For the de-interleaving operation to create the required field with shape m×m it is required to have a tensor with size $$\frac{m}{IF} \times \frac{m}{IF} \times IF^2.$$

The CBD block consists of two convolutional layers followed by a concatenation layer and a final convolution layer with $IF^2$ kernels. We note that for field inference models, two CBD modules are used to create the phase and amplitude in $\hat{P}_0 = \hat{A}_T \exp^{i\hat{\varphi}_0}$.

The U-Net model [24] (see FIG. 2D) is the core of our CNN and consists of five convolutional blocks. Two convolutional blocks in the contracting path (denoted with CBCn, where n is the block number) are each followed by a max-pooling layer (green arrows), which halves the spatial dimensions. In the expanding path, three convolutional blocks (denoted with CBEn, where n is the block number) are followed by up-sampling layers (red arrows), which double the spatial dimensions. The structure of CBCn modules is similar to the structure of CBI (see FIG. 2C), but without the concatenation layers. The structure of CBEn modules are similar to CBCn without the batch normalization (BN) layers, since early experimental results indicated that they reduce convergence speed. The output of the U-Net model is also concatenated with the raw input to facilitate residual learning.

2.4. Cost Function

To evaluate the performance of our algorithm in comparison with other CGH methods, we calculate the accuracy, AC, a quantitative measure of the similarity between the target intensity distribution, $I_T = |A_T|^2$, and the reconstructed hologram, $I_R=|A_R|^2$). The accuracy is based on the Euclidean norm in the volume of interest and defined as:

$$AC(I_T, I_R) = \frac{\sum_{x,y,z}(I_T, I_R)}{\sqrt{\left[\sum_{x,y,z}I_T^2\right]\left[\sum_{x,y,z}I_R^2\right]}}. \quad (3)$$

We note that AC=1 when the target and reconstruction are linearly proportional intensity distributions, therefore the total intensity (image brightness) of the reconstruction does not affect the value of AC. A hologram is considered feasible when there exist an optimal value for $\varphi_{SLM}$ that would yield a reconstruction for which AC=1. When a hologram is not feasible, AC<1, and the best achievable accuracy is an empirical measure of the hologram infeasibility. The accuracy is differentiable with respect to the parameters of the CNN and therefore also utilized as cost function to optimize the DeepCGH model parameters using stochastic gradient descent [23] during the initial unsupervised training step.

To train the model for 2D binary holography, our initial experiments indicated that Dice coefficient, commonly used in deep learning for image segmentation [24, 27], could improve the overall performance of DeepCGH when mixed with AC. Therefore our cost function also includes the Dice Coefficient, DC, defined as:

$$DC(I_T, I_R) = \frac{\sum_{x,y,z}(I_T, I_R)}{\sum_{x,y,z}I_T + \sum_{x,y,z}I_R}. \quad (4)$$

When $I_T, I_R \in [0,1]$, the upper bound of Eq. 4 is equal to 1. Since phase-modulation holograms conserve the amount of energy made available by the laser source, $A_S$, we normalized $I_R$ to synthesize holograms that have the same amount of total energy as $I_T$, i.e. $\Sigma_{x,y,z}I_T = \Sigma_{x,y,z}I_R$. However, the upper bound of $A_R$, and consequently DC, is not guaranteed to be equal to 1. This property of DC will result in holograms that focus light in one spot rather than following desired amplitude pattern. To train the CNN, our cost function is given by:

$$\text{cost}(I_T, I_R) = \lambda_1 AC(I_T, I_R) + \lambda_2 DC(I_T, I_R). \quad (5)$$

We tested DeepCGH to synthesize binary ($A_T \in \{0,1\}$) and gray level ($A_T \in [0,1]$) holograms. For binary 2D holograms, we selected $\lambda_1 = 1.1$, and $\lambda_2 = 0.5$. These coefficients were determined experimentally and may not be the optimum values for all image sizes and hologram types. We used the Adam optimizer [28] to find the optimal parameters of the CNN model, with different learning rates and batch sizes for different hologram size and configuration.

3. Results 3.1. Training Datasets

Each CNN model for DeepCGH is designed for a specific hologram resolution and 2D or 3D sampling of the volume of interest and must undergo an initial training step. The training dataset is made of a large number of input amplitudes, $A_T$, chosen to best represent the task of interest; for instance, a potential application of DeepCGH could be the fast photostimulation of custom neuron ensembles with optogenetics. We simulated this type of data by generating a random number of non-overlapping disks at random locations with fixed radius of 10 pixels to represent neuron somas under a 10× microscope objective. We considered binary holograms where the target intensity is 1 inside the disks, and 0 everywhere else (See FIG. 1A), as well as alternate models with gray level holograms where the intensities of the disks are randomly selected to be in the range of [0, 2, 1] (see FIG. 9A for an example 2D gray level image). Variable intensity is routinely needed in applications where precise control of light intensity is relevant, for instance in optogenetics, to address neurons with variable levels of opsin expression.

The datasets that we generated feature 30,000 randomized samples for training with an additional 1,000 samples to evaluate our model and compare our results to other CGH techniques in all of our 2D and 3D experiments. For 3D DeepCGH, we also chose to normalize the input data to enforce the conservation of the total optical power across each sectional plane, an essential feasibility criteria that target intensity distributions must meet to be feasible. Finally, to facilitate inference in the CNN model, the total intensity is adjusted to keep amplitudes between 0 and 1 in all pixels.

To evaluate the performance of DeepCGH, we compared our method to two existing CGH techniques. We implemented the Gerchberg-Saxton algorithm [9] for 2D and 3D CGH [29] to compare our method to the most commonly used CGH algorithm. We also implemented Non-Convex Optimization for Volumetric CGH (NOVO-CGH) [10], a slower CGH algorithm that yields superior results by optimizing an explicit cost function.

We implemented DeepCGH in Python programming language using Tensorflow 2.0 deep learning framework [30]. The models were trained with Nvidia GeForce RTX 2080Ti GPUs and tested on an Nvidia Titan RTX GPU. The GS and NOVO-CGH algorithms were implemented with MATLAB and tested with similar computer architecture and GPU speed.

3.2. 2D Holograms

Figure 3A:
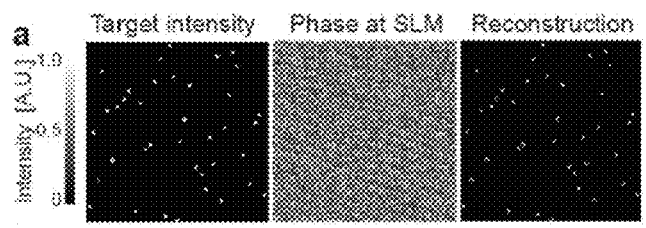
FIGS. 3A-3E illustrate simulation results comparing the performances of DeepCGH with existing algorithms (Gerchberg Saxton (GS), and NOVO-CGH) for 2D binary holograms.

Our first experiment aimed to evaluate the performance of DeepCGH in 2D binary holography. We created DeepCGH models for a broad range of resolutions with square windows of edge size m∈{128, 256, 512, 1024, 2048} pixels. Experimental results are shown in FIGS. 3A-3E. FIG. 3A shows an example target intensity, $I_T$, of size 256×256 pixels, SLM phase output, $\varphi_{SLM}$, and a reconstruction of the hologram, $I_R$. The interleaving factor, IF, is selected according to the hologram size to keep the U-Net model input size fixed. IF values are 4, 8, 16, 32, and 32 for images of square edge size, m=128, 256, 512, 1024, and 2048 pixels, respectively. For 2048 holograms, we refrained from increasing the IF value to 64 to avoid significantly increasing the number of parameters in the first convolutional layer, which would dramatically increase the time required for training. Other characteristics of the model, including the number of kernels and model structure, were fixed for different sizes. Sample-wise inference was performed using a multi-threaded software based on the Estimators module in Tensorflow [30] that facilitates high-speed, single sample inference of deep learning models.

Figure 3B:
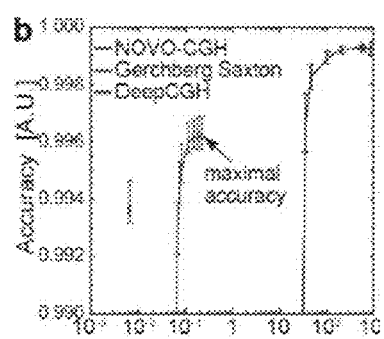

The performance of CGH algorithms was recorded by measuring the accuracy, AC, as a function of the computation time on 1000 test images for DeepCGH, and for GS and NOVO-CGH as the number of iterations is gradually increased. FIG. 3B shows performance results for holograms with m=1024 pixels (See FIG. 9B for additional results with values ranging from 128 to 2048 for the field inference model).

Figure 3C:
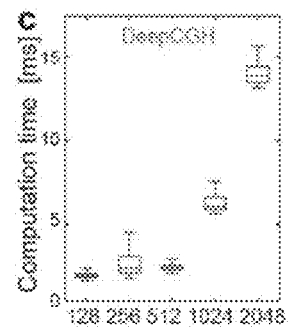
Figure 3D:
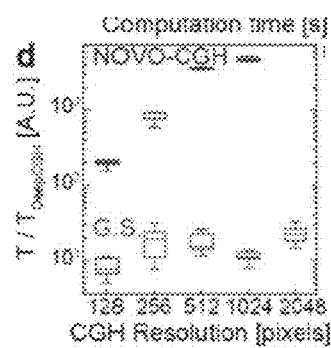
Figure 3E:
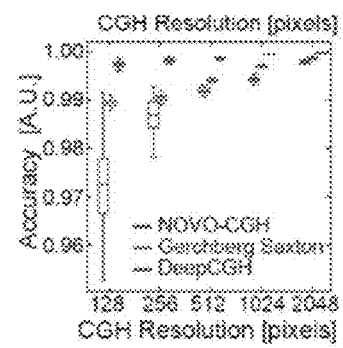

FIG. 3C shows single sample inference timings for different resolutions, m∈{128, 256, 512, 1024, 2048}. Phase inference DeepCGH computes the phase mask for these resolutions in 2.36, 2.72, 2.58, 6.28, and 14.11 ms on average, respectively. FIG. 3D shows $T/T_{DeepCGH}$ which is the ratio between the time, T, it takes for GS or NOVO-CGH to reach the same quality as DeepCGH and the inference time for DeepCGH, $T_{DeepCGH}$. Results indicate that Deep-CGH generates holograms at least one order of magnitude faster than GS and NOVO-CGH with similar accuracy. In 2D, GS and NOVO-CGH can generate holograms with higher accuracy than DeepCGH as long as the number of iterations, and therefore the computation time, is sufficient. Nonetheless, FIG. 3E shows that the best solutions obtained by iterative methods, regardless of the number of iterations, are no more than 2% better in accuracy than the solutions that DeepCGH obtains at record speeds. Also, the accuracy gain over DeepCGH becomes progressively smaller as the hologram size increases while the difference in computation time for the other methods significantly increases. (See FIGS. 8A-8E for results on non-binary 2D CGH).

3.3. 3D Holograms

For 3D DeepCGH, the volume of interest is split into multiple parallel planes along the optical axis distributed before and after the image plane at z=0. Any new discretization of the 3D volume of interest requires a dedicated CNN model and training. We built and trained models for 3, 7 and 11 planes evenly distributed along the z axis, and adjacent planes are separated by 5 mm. In all experiments, the wavelength of the coherent light source, $\lambda$, (see Eq. 1 and Eq. 2) is 1000 nm and f=200 mm.

Experimental results for binary holography with 3 planes and m=512 pixels are shown in FIGS. 4A-4C. The overall structure of the CNN is identical as in 2D experiments, except for the number of kernels for CBI and CBD modules, which is increased to 128, and for CBCn and CBEn modules, which is increased to $128\times 2^n$, where n indicates the block number in FIG. 2D. This update gives the CNN additional computing capacity to integrate the patterns from all the planes that define the volume of interest.

3D holograms are generally infeasible, because they impose successive intensity constraints that are mutually incompatible to a wave propagating in free-space. FIG. 4B shows a reconstruction of a sample hologram in the discretized volume, $I_R$, where all algorithms find approximate solutions that place a significant amount light in off-target locations.

Our results (see FIG. 4C) indicate that DeepCGH is able to synthesize holograms in 5 ms on average which is four and six orders of magnitude faster than the computation time required for GS and NOVO-CGH algorithms to reach convergence, respectively. Some timing variation was observed that can be attributed to the multi-threaded nature of operations on the operating system. We note that the increase in the inference time compared to 2D DeepCGH with similar size is due to the overall increased model capacity and data transfer latency from the computer memory to GPU memory.

More importantly, our results also indicate that 3D Deep-CGH is able to identify solutions with superior accuracy than the current state of the art. The average accuracy of the holograms generated by DeepCGH is 0.77 while the average value is 0.70 with NOVO-CGH, even after 3500 iterations and hours of computation. Since CGH is a non-convex problem, it had been predicted [10] that even high performance optimization methods based on gradient descent were likely to converge to a sub-optimal solution where the cost function reaches a local minimum. Our 3D results confirm this expectation by demonstrating that a substantial gain in accuracy, beyond what NOVO-CGH is able to achieve, remains possible under identical experimental conditions. Our 3D results suggest that DeepCGH adequately models the complex and non-linear mappings between all the planes in the discretized volume and is especially well fit to compute high fidelity approximations, especially when the target distributions are highly infeasible.

Figure 5A:
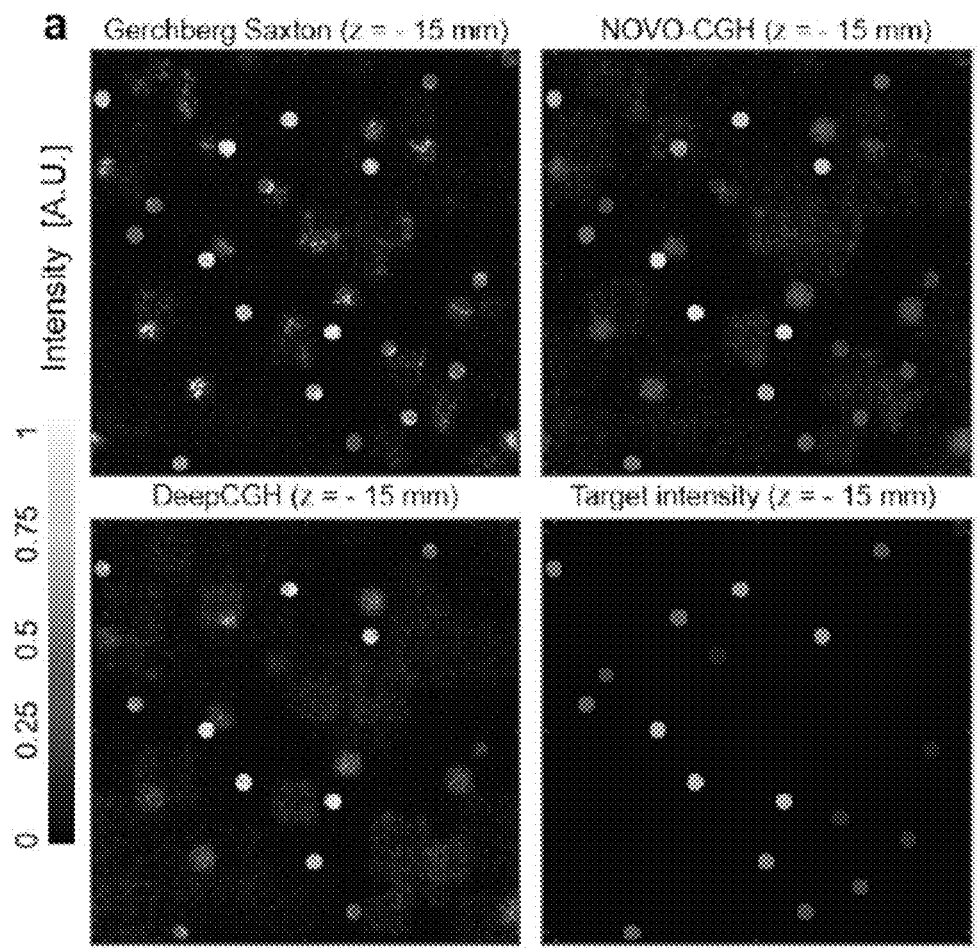
FIGS. 5A and 5B illustrate results for non-binary 3D hologram synthesis, comparing DeepCGH to GS and NOVO-CGH.
Figure 5B:
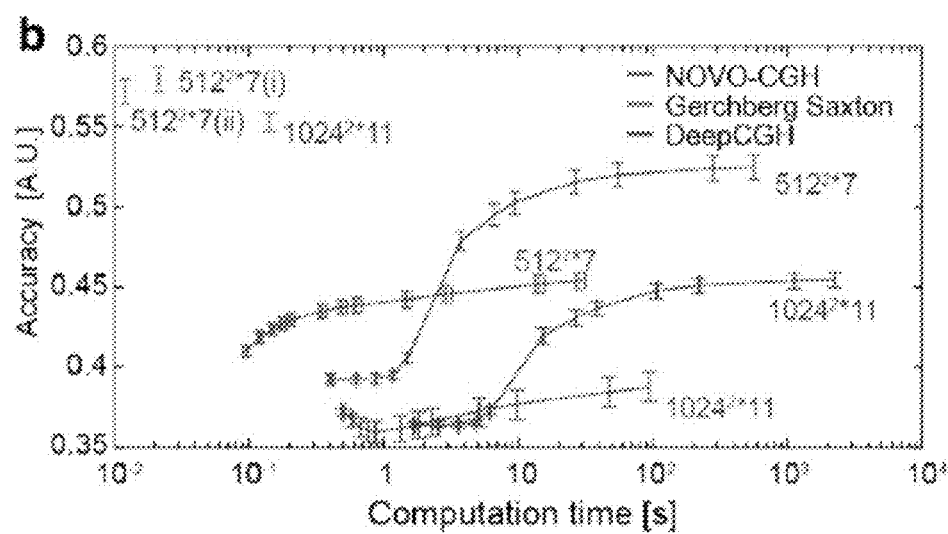

To demonstrate the ability of our model in generating 3D non-binary holograms, we also trained and tested DeepCGH with gray-level target intensity distributions. Additional 3D results are shown in FIGS. 5A and 5B. In this set of experiments the intensity of disks in individual planes are randomly selected to be between 0.2 and 1. We introduced three models with specific properties summarized in Table 1. We compared two models designed for identical hologram resolutions (m=512, p=7), but with a different number of kernels. The wide model, shown with $512^2*7(I)$, has twice as many kernels in each convolutional layer as the narrow model, shown with $512^2*7(II)$. For comparison, we trained and tested both the narrow and wide models on the same data sets.

TABLE 1

Simulation parameters for 3D gray level DeepCGH.

| 3D DeepCGH model | $512^2*7(I)$ | $512^2*7(II)$ | $1024^2*11$ |
|---|---|---|---|
| Resolution | 512 | 512 | 1024 |
| Number of planes | 7 | 7 | 11 |
| Interleaving factor | 16 | 16 | 32 |
| Kernels in CBI and CBD | 256 | 128 | 256 |
| Kernels in CBC1 and CBE1 | 256 | 128 | 256 |

The number of kernels for CBCn and CBEn modules are determined as k × $2^n$ where k is the number of kernels in the CBC1 and CBE1 modules, and = represents convolutional block number (see FIGS. 2A-2D).
We introduce two models with identical resolution (m = 512, p = 7) to show the effects of model capacity on timing and accuracy, as well as one model featuring p = 11 planes with m = 1024 to demonstrate high resolution holography capabilities.

FIG. 5A shows an illustrative reconstruction of the intensity for holograms (m=512) at distance z=−15 mm. The DeepCGH reconstructions shown in FIG. 5A correspond to the $512^2*7(I)$ model. Here, as in previous 3D results, we note that the hologram is almost certainly infeasible because of the proximity and the large number of planes in which the hologram intensity is constrained. In addition to the reconstruction of the target intensity at z=−15 mm, we observe the footprint of photons propagating towards other targets in adjacent planes. However, this footprint is less pronounced in DeepCGH compared to other techniques suggesting enhanced accuracy. FIG. 5B shows the accuracy as a function of computation time. Quantitative results averaged for 1000 test samples show that all the DeepCGH models that we considered (see Table 1) outperform other techniques in terms of speed and accuracy.

Results indicate that increasing the number of kernels from the narrow to wide model slightly increases both the average inference time, T, and the accuracy, from T=12.001 ms with AC=0.571 to T=21.470 ms with AC=0.578, respectively. Design flexibility of the DeepCGH model, illustrated in this example, represents a degree of freedom allowing custom implementations that prioritize quality over speed, if needed, and can help maximize the use of computational resources when holograms must be computed in a known, fixed time window.

We further increased the image size and number of depth planes to 1024 pixels with 11 planes. This covers an effective volume of $10.6\times 10.6\times 50$ mm$^3$. Results are shown in FIG. 5B, labeled $1024^2*11$, and demonstrate superior speed and accuracy of DeepCGH compared to other methods with identical volume size. It is also evident that as the hologram size and the number of planes increases, only a small drop in the accuracy of DeepCGH is observed. The average inference time for this model is 139.507 ms and the average accuracy is 0.553.

Comparing our 2D and 3D results indicates that Deep-CGH outperforms iterative exploration techniques as the complexity of the CGH problem increases. This observation is systematic in 3D where the CGH problem is generally over-constrained, with holograms becoming less physically feasible as the number of depth planes increase.

3.4. Model Generalization

Figure 6:
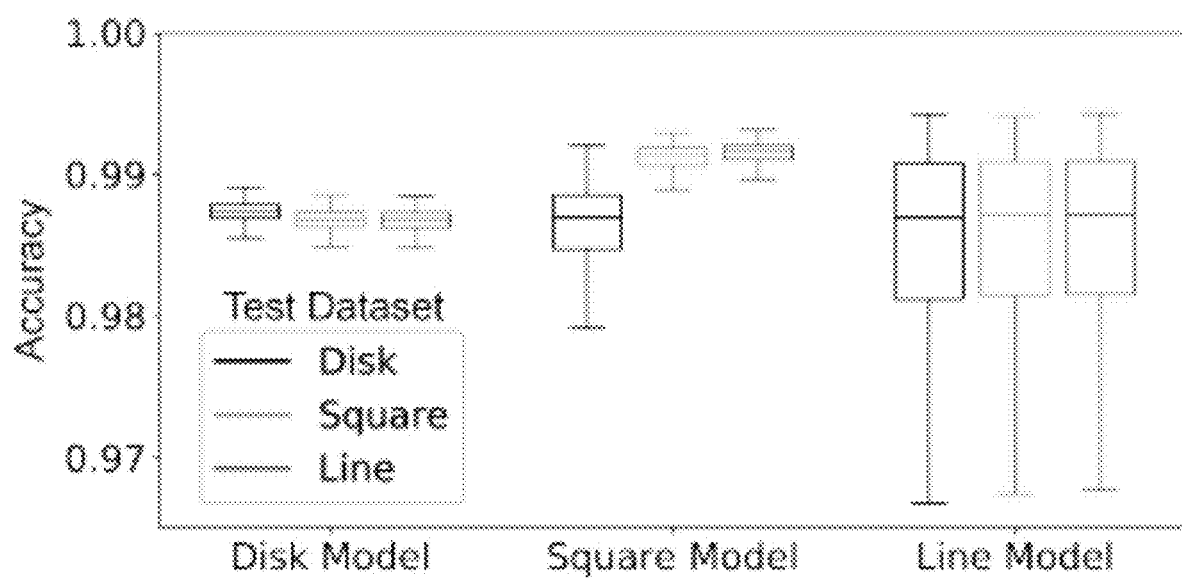
FIG. 6 illustrates a comparison of the accuracy of DeepCGH reconstructions when the model is trained (on 30,000 samples), then tested (on 1000 samples) on three distinct image data sets made of either randomized disks, squares, or lines.

To investigate the generalization capabilities of Deep-CGH, we compared the accuracy of DeepCGH holograms when the model is trained and tested on different types of data. We introduced three data sets of 2D images with resolution m=512 each with either a random number of disks, squares, or lines. FIG. 6 shows accuracy measurements on 1000 test samples after training and testing the model with all the combinations of the three different data types. As expected, the accuracy of DeepCGH slightly decreases when it is tested on a different type of image data than what the model was trained on. However, the results also indicate that for most models the drop is detectable, but relatively insignificant. Moreover, the results show that the square model performs better than the line model when tested with the line data set. We believe that this could be due to the increased complexity of the square data compared to the line data. This complexity helps the CNN explore a wider range of the manifold that represents the mapping from target intensities to SLM modulations. As a result, the CNN learns a mapping that is more generalized compared to the line model. The results show that DeepCGH only slightly overt its to the specific dataset for which it is trained. Our model is therefore generalizable, meaning that it can be trained for one data type, (e.g. disks), yet used to generate squares or even lines without a significant drop in the performance. This result is relevant in applications where slight variability is expected in the holograms that are synthesized under experimental conditions. For instance, in optogenetics, the shape of the neuron is never exactly determined and varies from animal to animal. In this application a model could be trained for a specific neuron type, but it could be reliably used for a different type, all without re-training. In other applications, one can also choose to overfit the model to a specific data type matching a particular task and application with additional gains in accuracy.

4. Conclusion

We have developed DeepCGH, a new algorithm based on CNNs for computer generated holography. DeepCGH operates with a fixed computation time that is predetermined by the hologram size and model complexity. In 2D, our method can accommodate a broad range of hologram resolutions which we tested for up to 4 megapixels, and yields accurate solutions orders of magnitude faster than iterative algorithms. In the case of 3D holograms, where target illumination distributions are particularly infeasible, we found that DeepCGH not only synthesizes extremely large holograms (up to 11 Megavoxels) at record speeds, but also reliably identifies solutions with greater accuracy than existing techniques. In-place holography simplifies the mapping that the CNN performs and best utilizes the capabilities of CNNs compared to similar CNN-based approaches. DeepCGH can be easily customized to accommodate for various spatial discretizations of the volume of interest and SLM resolutions by adjusting the number of input channels, the interleaving factor, and number of kernels in the CNN model. Finally, DeepCGH enables unsupervised training of the CNN, allowing the model to be tailored for custom applications of holography by selecting a training dataset that best matches the desired real-world experimental conditions, as there is no need to explicitly provide ground truth phase masks. The cost function can also be customized to optimize the model not for hologram accuracy, but directly for the desired outcome, in order to best execute a user-defined task.

Supplementary Material

1. Neural Network Details

All the convolutional blocks of the convolutional neural network (CNN) in our model have a window size of 3×3 with stride 1. Experimental results indicated that this window size and stride have the best performance over other sizes. The activation function for all convolutional layers is the rectified linear unit (ReLU) [31], which is a popular choice known for high speed gradient computation. For and arbitrary input x, ReLU(x) is defined as:

$$\text{ReLU}(x) = \text{maximum}(0, x) \tag{S1}$$

In the CBD module, both for the field inference and phase inference models, we dropped the activation function for the last convolutional layer that predicts the phase, because phase can have negative values as well. In complex inference models, we implemented two separate CBD modules, one for the amplitude, and the other one for the phase of the estimated complex field, $P_0$. The max-pooling layers have window size of 2×2 with stride one, thus halving the spatial dimensions of the tensor. The window size for the up-sampling layer is 2×2 with stride one, therefore doubling the spatial dimensions of the input tensor.

We relied on the Adam optimizer [32] to train our model. Our experiments indicated that batch sizes can vary between 32 and 256 without a significant drop in convergence. We selected a batch size in the aforementioned range depending on the size of the images and the network. For the models we tested: $1024^2*11$, $512^2*7$, $512^2*3$, 2048×2048, 1024×1024, 512×512, 256×256, and 128×128, the batch size was set to 32, 32, 64, 32, 32, 64, 128, and 256 respectively. We adjusted the learning rate between $10^{-5}$ and $10^{-3}$. A learning rate of $10^{-4}$ converged well for all image sizes and for both 2D and 3D holograms. The other parameters of the optimizer: $\beta_1$ and $\beta_2$, were set to 0.900 and 0.999 respectively.

Near field wave propagation (Fresnel propagation) and wave propagation through a f-f system (optical Fourier transform) were all modeled using Tensorflow's Fast Fourier Transform (FFT). Experimental results showed a slight difference between the different implementations of FFT in Matlab, Numpy, and Tensorflow which are attributed to different conventions for the definition of the FFT.

2. 2D Phase Inference Model

Figure 7A:
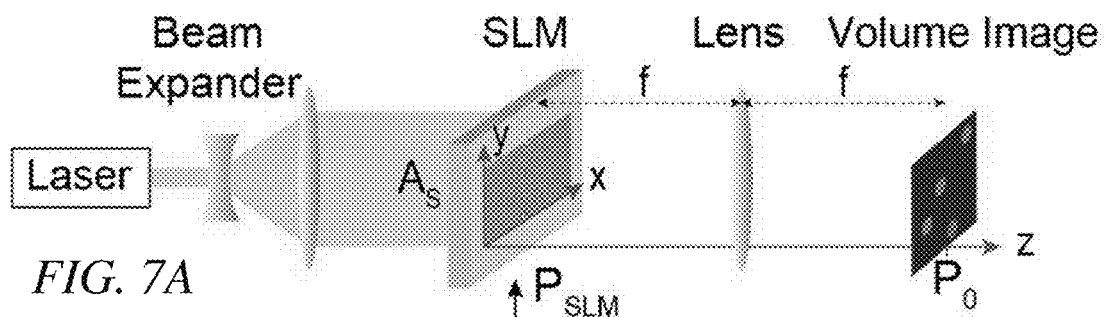
FIG. 7A illustrates experimental set up for DeepCGH.
Figure 7B:
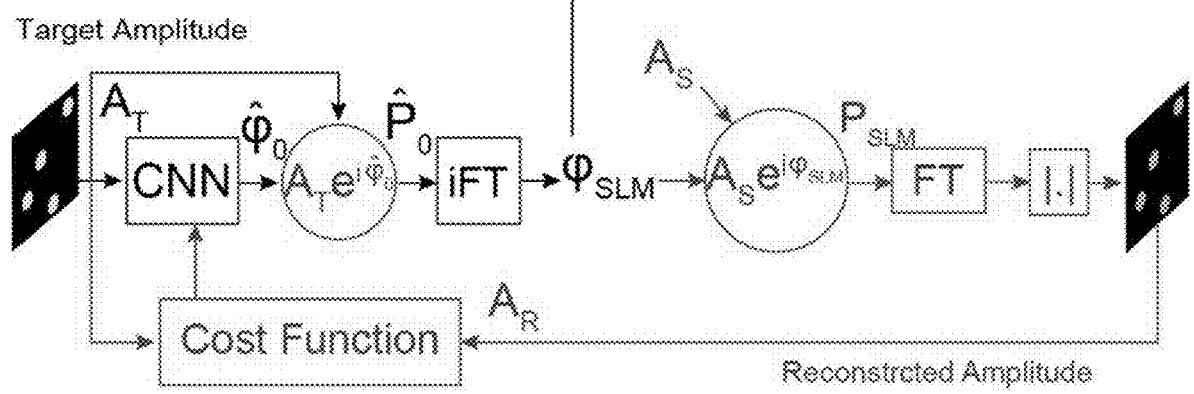
FIG. 7B illustrates the phase inference DeepCGH algorithm. The CNN predicts only the phase at the image plane, $\hat{\phi}$ which is paired with the target amplitude $A_T$ to construct the complex field at the image plane.

The model for DeepCGH in 2D can be simplified by only estimating the phase of the complex field at the image plane, $\hat{\varphi}_0$, with the CNN. The phase inference model for 2D DeepCGH is shown in FIGS. 7A and 7B. To reconstruct the complex field at the image plane the amplitude is assumed to be exactly equal to the target amplitude, $A_T$.

3. 2D Binary and Gray-Level Experiments

Figure 8A:
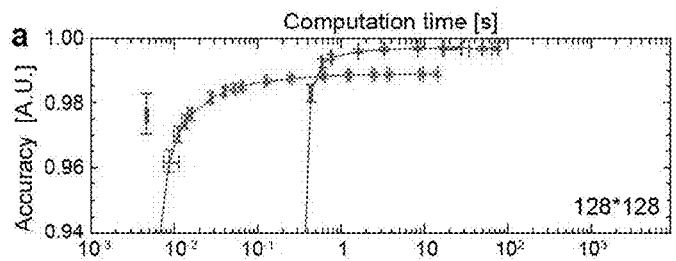
FIGS. 8A-8E illustrate simulation results for 2D binary holograms comparing field inference DeepCGH with GS and NOVO-CGH for different image sizes.
Figure 8B:
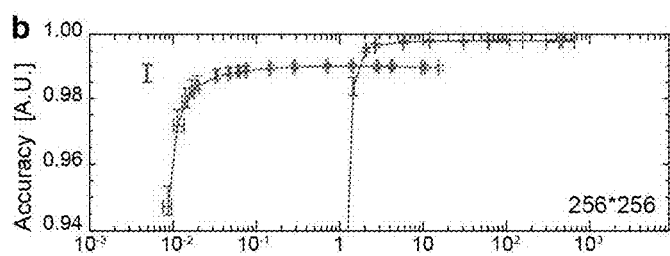
Figure 8C:
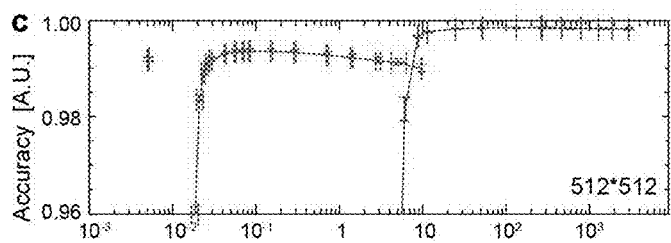
Figure 8D:
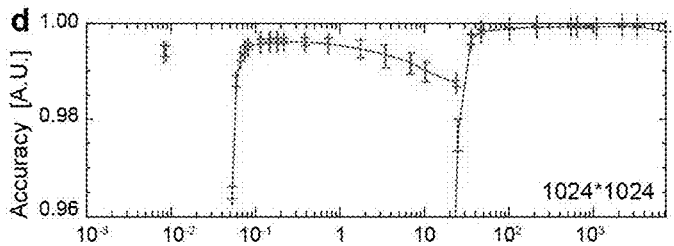
Figure 8E:
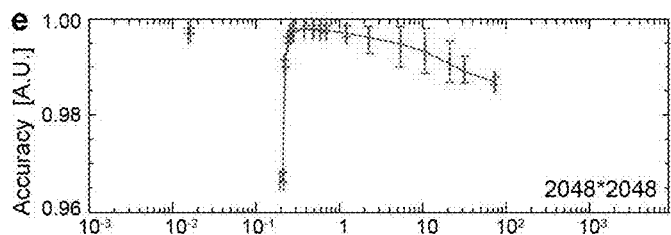

FIGS. 8A-8E shows additional experimental results for 2D binary holograms with the filed inference model. FIG. 8A shows the general experimental set up for 2D CGH and FIGS. 8B, 8C, 8D, 8E, and 8F show the accuracy of DeepCGH and other CGH methods as a function of computation time for holograms of size 128, 256, 512, 1024, and 2048. For the 2048 holograms NOVO-CGH failed to converge for all samples except one and therefore is not shown in Figure S2f.

Figure 9A:
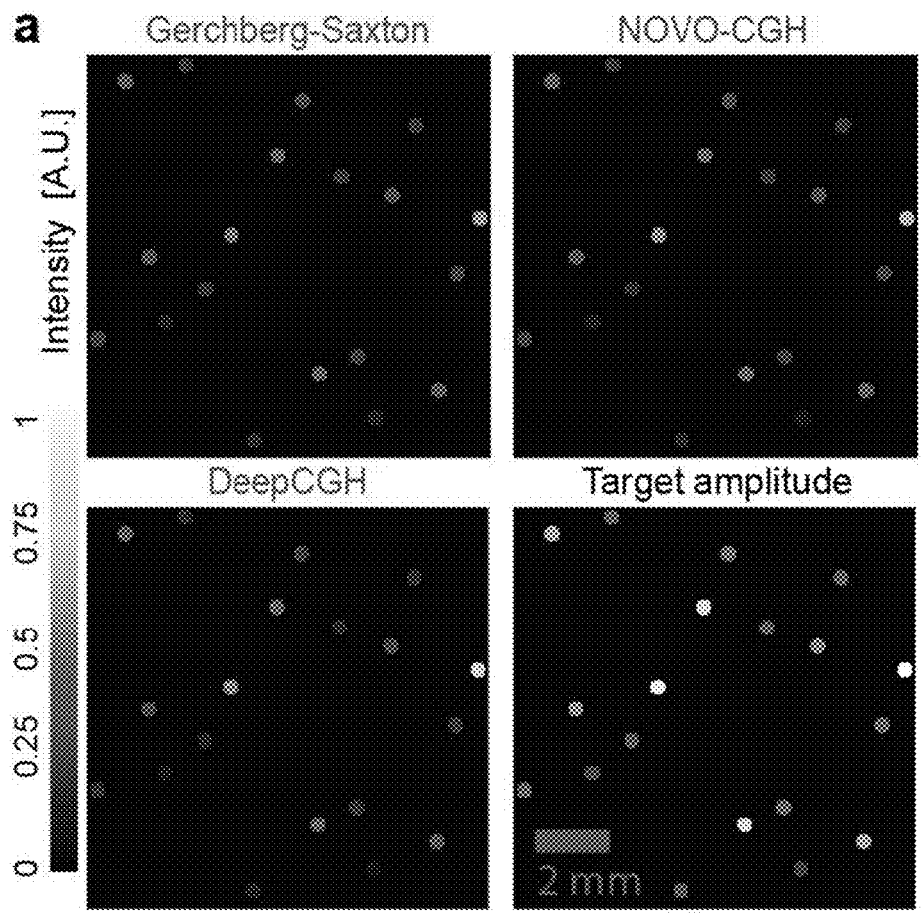
FIGS. 9A-9B illustrates simulation results for 2D gray level holograms (512 512 pixels) comparing DeepCGH with GS and NOVOCGH.
Figure 9B:
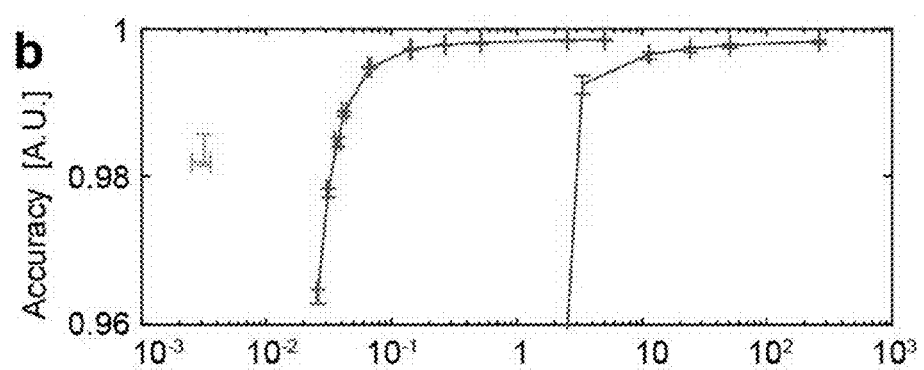

FIGS. 9A and 9B show the experimental results for 2D gray-level images with size of 512. The intensity of each disk is randomly selected between 0.2 and 1. FIG. 9A shows example target intensity and the reconstructed illumination pattern using different CGH techniques. FIG. 9B shows the accuracy of CGH techniques as a function of time. The CNN is phase inference.

Exemplary Overall Implementation

Figure 10:
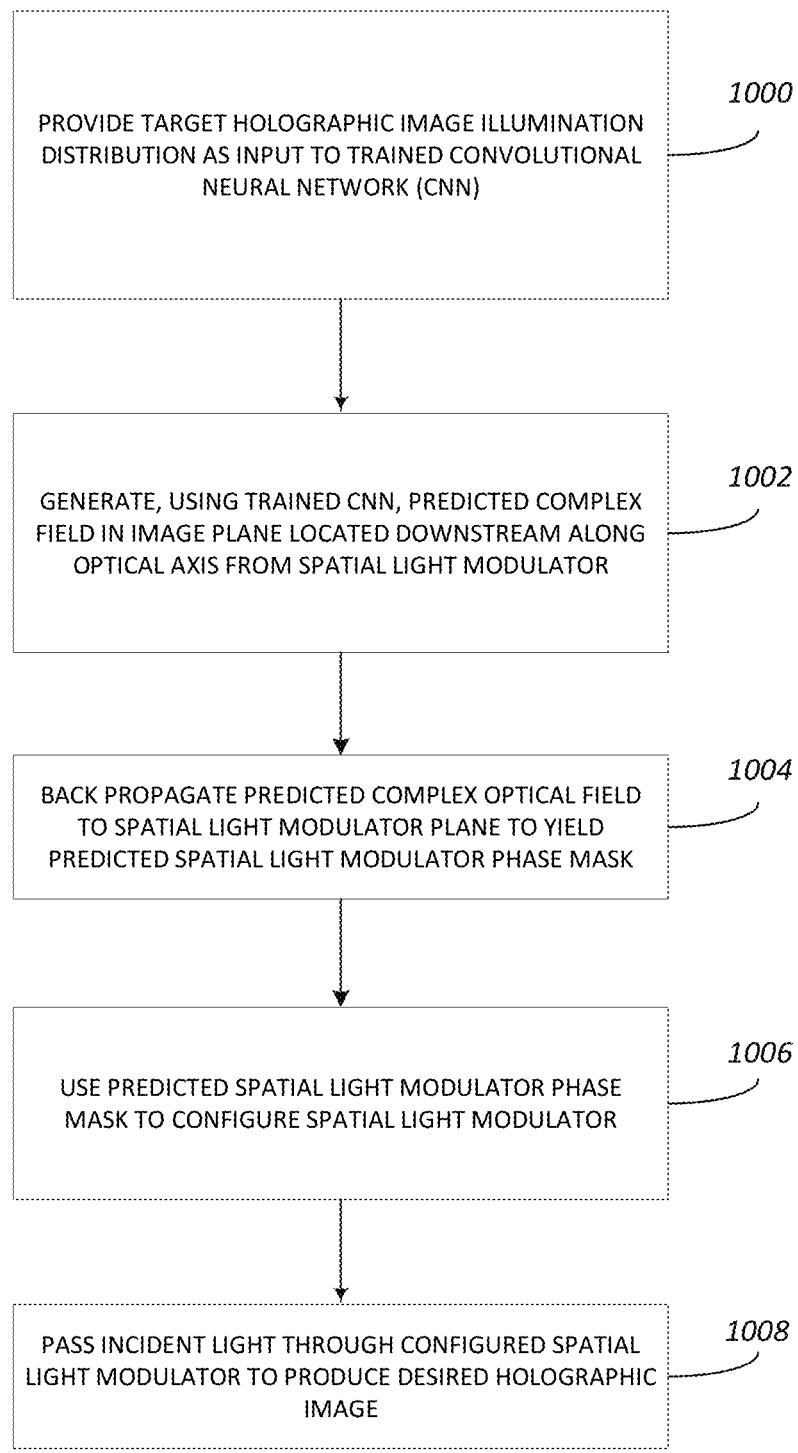
FIG. 10 is a flow chart illustrating an exemplary process for computer generated holography using a convolutional neural network according to the subject matter described herein.

FIG. 10 is a flow chart illustrating an exemplary process for computer generated holography according to the subject matter described herein. Referring to FIG. 10, in step 1000, the process includes providing a target holographic image illumination distribution as input to a trained convolutional neural network. For example, a target 2D or 3D image illumination pattern may be presented to the trained CNN illustrated in FIG. 1B as input.

In step 1002, the process includes generating, using the trained CNN, a predicted complex optical field in an image plane located downstream along an optical axis from a spatial light modulator. For example, as illustrated in FIGS. 1A and 1B, the complex optical field $P_0$ is computed at the image plane (z=0), which is in the middle of the target image volume. In an alternate implementation, the complex optical field can be computed anywhere along the optical axis.

In step 1004, the process includes back propagating the complex optical field to a spatial light modulator plane to yield a predicted spatial light modulator phase mask. For example, the phase portion of the complex optical field or the entire complex optical field $P_0$ can be back propagated along the optical axis to the location of the SLM. Such back propagation can be achieved using a near field wave propagation equation. In one example, the near field wave propagation equation used to back propagate the complex optical field is the Fresnel propagation equation, which is illustrated above as Equation 2. The phase portion of the complex optical field at the location of the SLM is the predicted phase mask of the SLM that yields the desired target image. It should be noted that only a single pass is needed to generate the phase mask for the SLM, which can be compared with the iterative methods described above where multiple iterations or passes are required to yield the SLM phase mask.

In step 1006, the spatial light modulator is configured using the phase mask. For example, the predicted phase mask is used to generate pixel values for pixels in the spatial light modulator to yield the desired phase mask.

In step 1008, the process includes passing incident light through the configured spatial light modulator to produce a desired holographic image. For example, light from the laser may pass through the configured SLM to produce a 2D or 3D holographic image. Because only a single iteration is required, the 2D or 3D holographic image can be used in applications requiring high speed holography, such as virtual reality headsets, biomedical applications, and optical trapping, where lasers are used to move physical objects.

Figure 11:
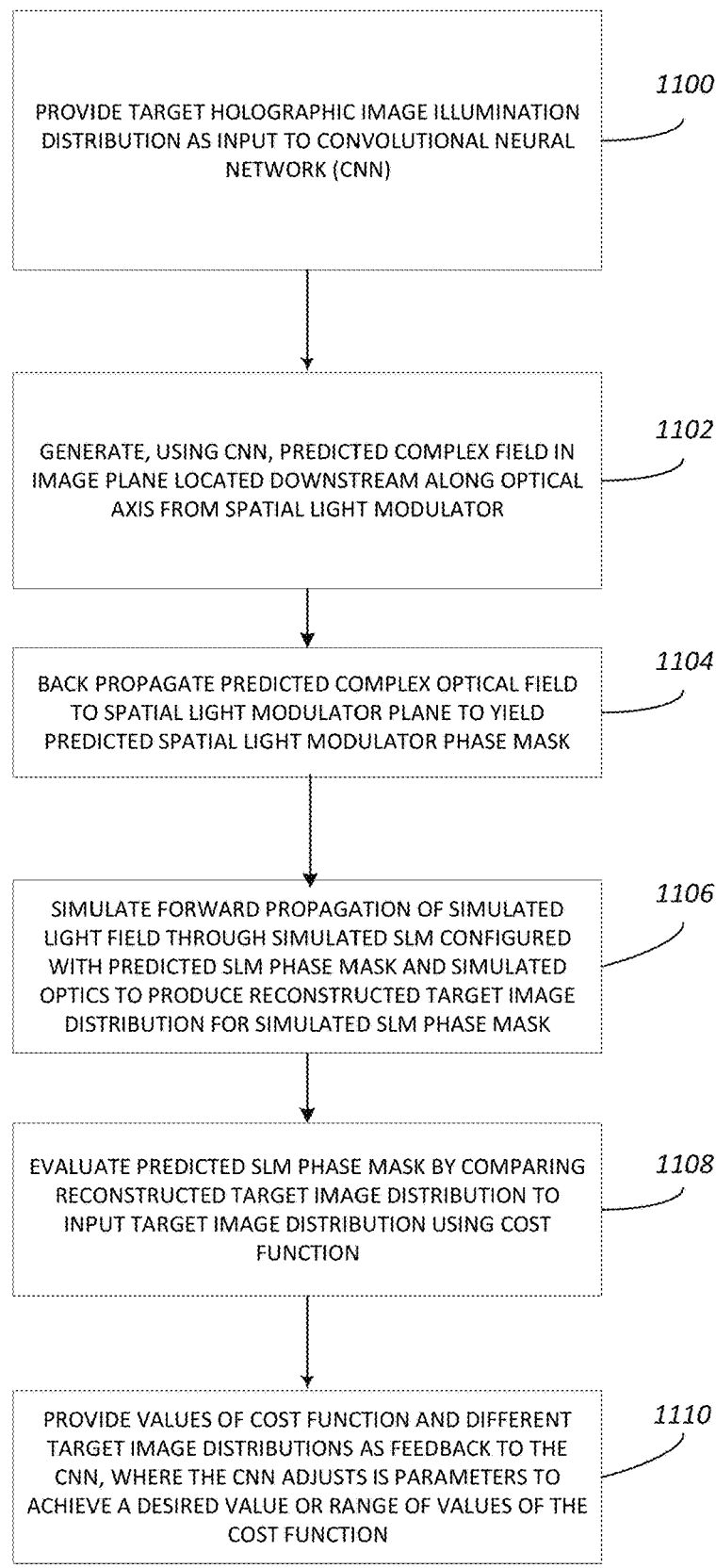
FIG. 11 is a flow chart illustrating an exemplary process for training a convolutional neural network for computer generated holograph according to the subject matter described herein.

According to another aspect of the subject matter described herein, a process for training a CNN for computer holography is provided. FIG. 11 is a flow chart of such a process. Referring to FIG. 11, in step 1100, the process includes providing a target illumination distribution as input to a CNN. The target illumination distribution may be 3D or 2D desired holographic images that are tailored to the application for which the computer holography is being implemented. For example, if the holography application is a virtual reality headset for a conferencing environment, the target illumination distributions used for training may be images of people.

In step 1102, the process includes generating, using the CNN, a predicted or estimated complex optical field in an image plane located downstream along an optical axis from a spatial light modulator. For example, is show in FIGS. 1A and 1B, the complex optical field $\hat{P}_0$ at the image plane (z=0) may be generated by the CNN.

In step 1104, the process includes back propagating the complex optical field to the spatial light modulator plane to yield a predicted spatial light modulator phase mask. For example, as illustrated in FIGS. 1A and 1B, a near field wave propagation equation (see Equation 2 for Fresnel propagation) is used to transform the complex optical field at z=0 to the field at $z=z_{SLM}$, where $z_{SLM}$ is the location of the SLM on the optical axis. The phase of the complex optical field at $z=z_{SLM}$ is the complex phase mask to be displayed by the SLM. It should be noted that to this point, the steps for training the CNN are the same as those for using the CNN in FIG. 10.

However, rather than using the untrained CNN to configure the real SLM and modulate a real light beam, during training, the next step (step 1106) is to simulate forward propagation of a simulated light field through a simulated SLM configured with the predicted SLM phase mask and through simulated optics to produce a reconstructed target image distribution for the predicted SLM phase mask. For example, as illustrated in FIGS. 1A and 1B, a simulated light field $A_s$ is forward propagated through a mathematical model, $A_s e^{j\varphi_{SLM}}$, of the SLM to produce $P_{SLM}$, which is the simulated complex field output from the simulated SLM. $P_{SLM}$ is then propagated through a mathematical model of the optical system, indicted by FT (optical Fourier Transform) (see Equation 2) to produce a reconstructed target image distribution, which is illustrated in FIG. 1B by $P_0$, the reconstructed complex field at z=0, $P_z$, the complex field at z=z and $P_{-z}$, the complex field at z=−z. It is understood that any number of reconstructed image planes may be generated, depending on the desired optical resolution of the target image distribution in the z direction.

In step 1108, the process includes evaluating the predicted SLM phase mask by comparing the reconstructed target image illumination distribution with the target image illumination distribution input to the CNN using a cost function. For example, as illustrated in FIGS. 1A and 1B, the reconstructed target image illumination amplitude distribution AR and the target image illumination amplitude distribution $A_T$ are input into the cost function. The cost function used may be tailored to the particular holography application. Examples of cost functions that may be used include efficacy and accuracy, as described above.

In step 1110, the process includes providing values of the cost function and different target image illumination distributions as feedback to the CNN, and the CNN adjusts its parameters to achieve a desired value or range of values of the cost function. For example, the training process in FIGS. 1A and 1B may be repeated with different target image illumination distributions as input to produce different estimated complex optical fields and corresponding SLM phase masks until an SLM phase mask that yields a desired value of the cost function (e.g., 95% efficacy or accuracy) is generated. Because the training system illustrated in FIGS. 1A and 1B relies on the CNN to compute the complex field in z=0, the CNN input and output share strong spatial correspondence (have rather similar intensity distributions), the trained CNN is more accurate than conventional solutions where the CNN input is a target image illumination distribution and the CNN output is an SLM phase mask, which may not have similar intensity distributions. In addition, the trained CNN in FIGS. 1A and 1B can achieve high accuracy in a single pass in operation, which can be contrasted with the iterative methods described herein, which require multiple iterations to compute an optimal SLM mask, even after the CNN is trained.

The disclosure of each of the following references is hereby incorporated herein by reference in its entirety.

REFERENCES

1. K. C. Neuman and S. M. Block, "Optical trapping," Rev. scientific instruments 75, 2787-2809 (2004).
2. S. Koller, "Optical trapping: Techniques and applications," in *Student Research Celebration*, (Montana State University, 2017), pp. 1-1.
3. A. R. Mardinly, I. A. Oldenburg, N. C. Pégard, S. Sridharan, E. H. Lyall, K. Chesnov, S. G. Brohawn, L. Waller, and H. Adesnik, "Precise multimodal optical control of neural ensemble activity," Nat. neuroscience 21, 881-893 (2018).
4. P. Pozzi, L. Maddalena, N. Ceffa, O. Soloviev, G. Vdovin, E. Carroll, and M. Verhaegen, "Fast calculation of computer generated holograms for 3d photostimulation through compressive-sensing gerchberg-saxton algorithm," Methods protocols 2, 2 (2019).
5. W. Yang and R. Yuste, "Holographic imaging and photostimulation of neural activity," Curr. opinion neurobiology 50, 211-221 (2018).
6. J.-H. Park, "Recent progress in computer-generated holography for three-dimensional scenes," J. Inf. Disp. 18, 1-12 (2017).
7. R. Häussler, N. Leister, and H. Stolle, "Large holographic 3d display for real-time computer-generated holography," in *Digital Optical Technologies* 2017, vol. 10335 (International Society for Optics and Photonics, 2017), p. 103350X.
8. D. Leseberg, "Computer-generated three-dimensional image holograms," Appl. Opt. 31, 223-229 (1992).
9. R. W. Gerchberg, "A practical algorithm for the determination of phase from image and diffraction plane pictures," Optik 35, 237-246 (1972).
10. J. Zhang, N. Pégard, J. Zhong, H. Adesnik, and L. Waller, "3d computer-generated holography by non-convex optimization," Optica 4, 1306-1313 (2017).
11. P. Chakravarthula, Y. Peng, J. Kollin, H. Fuchs, and F. Heide, "Wirtinger holography for near-eye displays," ACM Trans. Graph. 38 (2019).
12. P. Chakravarthula, Y. Peng, J. Kollin, F. Heide, and H. Fuchs, "Computing high quality phase-only holograms for holographic displays," in *Optical Architectures for Displays and Sensing in Augmented, Virtual, and Mixed Reality (AR, VR, MR)*, vol. 11310 (International Society for Optics and Photonics, 2020), p. 1131006.
13. N. C. Pégard, A. R. Mardinly, I. A. Oldenburg, S. Sridharan, L. Waller, and H. Adesnik, "Three-dimensional scanless holographic optogenetics with temporal focusing (3d-shot)," Nat. communications 8, 1228 (2017).
14. Z. Zhang, L. E. Russell, A. M. Packer, O. M. Gauld, and M. Hausser, "Closed-loop all-optical interrogation of neural circuits in vivo," Nat. methods 15, 1037-1040 (2018).
15. Y. Wang, D. Dong, P. J. Christopher, A. Kadis, R. Mouthaan, F. Yang, and T. D. Wilkinson, "Hardware implementations of computer-generated holography: a review," Opt. Eng. 59, 102413 (2020).
16. P. Pozzi, L. Maddalena, N. Ceffa, O. Soloviev, G. Vdovin, E. Carroll, and M. Verhaegen, "Fast calculation of computer generated holograms for 3d photostimulation through compressive-sensing gerchberg-saxton algorithm," Methods protocols 2, 2 (2019).
17. R. Horisaki, R. Takagi, and J. Tanida, "Deep-learning-generated holography," Appl. optics 57, 3859-3863 (2018).
18. J. W. Goodman, *Introduction to Fourier optics* (Roberts and Company Publishers, 2005).
19. Y. Xue, S. Cheng, Y. Li, and L. Tian, "Reliable deep-learning-based phase imaging with uncertainty quantification," Optica 6, 618-629 (2019).
20. Y. Wu, Y. Rivenson, Y. Zhang, Z. Wei, H. Gunaydin, X. Lin, and A. Ozcan, "Extended depth-of-field in holographic imaging using deep-learning-based autofocusing and phase recovery," Optica 5, 704-710 (2018).
21. Y. Rivenson, Y. Zhang, H. Günaydin, D. Teng, and A. Ozcan, "Phase recovery and holographic image reconstruction using deep learning in neural networks," Light. Sci. & Appl. 7, 17141-17141 (2018).
22. Y. Rivenson, Y. Wu, and A. Ozcan, "Deep learning in holography and coherent imaging," Light. Sci. & Appl. 8, 1-8 (2019).
23. I. Goodfellow, Y. Bengio, and A. Courville, Deep Learning (MIT Press, 2016). http://www.deeplearningbook.org.
24. O. Ronneberger, P. Fischer, and T. Brox, "U-net: Convolutional networks for biomedical image segmentation," in *International Conference on Medical image computing and computer-assisted intervention*, (Springer, 2015), pp. 234-241.
25. W. Shi, J. Caballero, F. Huszar, J. Totz, A. P. Aitken, R. Bishop, D. Rueckert, and Z. Wang, "Real-time single image and video super-resolution using an efficient sub-pixel convolutional neural network," in *Proceedings of the IEEE conference on computer vision and pattern recognition*, (2016), pp. 1874-1883.
26. S. Ioffe and C. Szegedy, "Batch normalization: Accelerating deep network training by reducing internal covariate shift," arXiv preprint arXiv:1502.03167 (2015).
27. M. H. Eybposh, M. H. Ebrahim-Abadi, M. Jalilpour-Monesi, and S. S. Saboksayr, "Segmentation and classification of cine-mr images using fully convolutional networks and handcrafted features," CoRR abs/1709.02565 (2017).
28. D. P. Kingma and J. Ba, "Adam: A method for stochastic optimization," arXiv preprint arXiv:1412.6980 (2014).
29. R. Piestun, B. Spektor, and J. Shamir, "Wave fields in three dimensions: analysis and synthesis," J. Opt. Soc. Am. A 13, 1837-1848 (1996).
30. M. Abadi, A. Agarwal, P. Barham, E. Brevdo, Z. Chen, C. Citro, G. S. Corrado, A. Davis, J. Dean, M. Devin, S. Ghemawat, I. Goodfellow, A. Harp, G. Irving, M. Isard, Y. Jia, R. Jozefowicz, L. Kaiser, M. Kudlur, J. Levenberg, D. Mané, R. Monga, S. Moore, D. Murray, C. Olah, M. Schuster, J. Shlens, B. Steiner, I. Sutskever, K. Talwar, P. Tucker, V. Vanhoucke, V. Vasudevan, F. Viégas, O. Vinyals, P. Warden, M. Wattenberg, M. Wicke, Y. Yu, and X. Zheng, "TensorFlow: Large-scale machine learning on heterogeneous systems," (2015). Software available from tensorflow.org.
31. A. Krizhevsky, I. Sutskever, and G. E. Hinton, "Imagenet classification with deep convolutional neural networks," in Advances in neural information processing systems, (2012), pp. 1097-1105.

32. D. P. Kingma and J. Ba, "Adam: A method for stochastic optimization," arXiv preprint arXiv:1412.6980 (2014).

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for computer-generated holography, the method comprising:
   providing a target holographic image illumination distribution as input to a trained convolutional neural network (CNN);
   generating, using the trained CNN, a predicted complex optical field in an image plane located downstream along an optical axis from a spatial light modulator;
   back propagating the complex optical field to a spatial light modulator plane to yield a predicted spatial light modulator phase mask;
   configuring the spatial light modulator using the predicted spatial light modulator phase mask; and
   passing incident light through the configured spatial light modulator to produce a holographic image.

2. The method of claim 1 wherein the target holographic image illumination distribution comprises a three dimensional (3D) illumination distribution and wherein the holographic image comprises a 3D holographic image.

3. The method of claim 1 wherein the target holographic image illumination distribution comprises a two dimensional (2D) illumination distribution and wherein the holographic image comprises a 2D holographic image.

4. The method of claim 1 wherein providing the target holographic image illumination distribution as input to the trained CNN includes interleaving different target holographic images and providing the interleaved images as input to the trained CNN.

5. The method of claim 1 wherein generating the predicted complex optical field in the image plane located downstream from the spatial light modulator includes generating the predicted complex optical field in an image plane located within a target image volume.

6. The method of claim 1 wherein back propagating the complex optical field to the spatial light modulator plane includes computing a near field wave propagation of the complex optical field.

7. The method of claim 6 wherein computing the near field wave propagation includes computing the near field wave propagation using the following equation for Fresnel wave propagation:

$$P_z(x, y) = \int\int \frac{P_0(x', y')}{\sqrt{i\lambda z}} \exp\left[\frac{i\pi((x-x')^2 + (y-y')^2)}{\lambda z}\right] dx'dy',$$

where $P_z(x,y)$ is the complex optical field at any location z along the optical axis, x and y are dimensions of the complex optical field along axes transverse to the optical axis, $P_0(x', y')$ is the complex optical field at the image plane in z=0, x' and y' are dimensions of the complex optical field along the axes transverse to an optical path in the image plane, $\lambda$ is a wavelength of the incident light.

8. The method of claim 1 wherein the CNN is trained using target holographic image illumination distributions as input to produce estimated complex optical fields as output.

9. The method of claim of claim 1 the CNN is trained using a user-specified cost function that measures dissimilarity between target holographic image illumination distributions and simulation results.

10. A method for training a convolutional neural network for computer generated holography, the method comprising:
    providing a target holographic image illumination distribution as input to a convolutional neural network (CNN);
    generating, using the CNN, a predicted complex optical field in an image plane located downstream along optical axis from a spatial light modulator (SLM);
    back propagating the predicted complex optical field to spatial light modulator plane to yield predicted spatial light modulator phase mask;
    simulating forward propagation of a simulated light field through a simulated SLM configured with the predicted SLM phase mask and simulated optics to produce reconstructed target image distribution;
    evaluating the predicted SLM phase mask using a cost function that generates values based on a comparison between the reconstructed target image distribution and the target holographic image illumination distribution input to the CNN; and
    providing the values of the cost function and different desired target holographic image illumination distributions as feedback to the CNN, wherein the CNN adjusts its parameters to achieve a desired value or range of values of the cost function.

11. A system for computer-generated holography, the system comprising:
    a configurable spatial light modulator (SLM) for modulating an incident light beam;
    a trained convolutional neural network (CNN) for receiving, as input, a target holographic image illumination distribution and for generating a predicted complex optical field in an image plane located downstream along an optical axis from the SLM;
    an optical field back propagation module for back propagating the complex optical field to a spatial light modulator plane to yield a predicted spatial light modulator phase mask; and
    an SLM configuration module for configuring the spatial light modulator using the phase mask to modulate the incident light beam and produce a holographic image.

12. The system of claim 11 wherein the target holographic image illumination distribution comprises a three dimensional (3D) holographic image illumination distribution and wherein the holographic image comprises a 3D holographic image.

13. The system of claim 11 wherein the target holographic image illumination distribution comprises a two dimensional (2D) holographic image illumination distribution and wherein the holographic image comprises a 2D holographic image.

14. The system of claim 11 wherein the CNN is configured to receive interleaved target holographic image illumination distributions.

15. The system of claim 11 wherein the CNN is configured to generate the predicted complex optical field in an image plane located within a target image volume.

16. The system of claim 11 wherein the back propagation module is configured to compute a near field wave propagation of the complex optical field.

17. The system of claim 16 wherein the back propagation module is configured to compute the near field wave propagation of the complex optical field using the following equation for Fresnel propagation:

$$P_z(x, y) = \int\int \frac{P_0(x', y')}{\sqrt{i\lambda z}} \exp\left[\frac{i\pi((x-x')^2 + (y-y')^2)}{\lambda z}\right] dx'dy',$$

where $P_z(x,y)$ is the complex optical field at any location z along the optical axis, x and y are dimensions of the complex optical field along axes transverse to the optical axis, $P_0(x', y')$ is the complex optical field at the image plane, x' and y' are dimensions of the complex optical field along the axes transverse to the optical path in the image plane, $\lambda$ is a wavelength of the incident light.

18. The system of claim 11 wherein the CNN is trained using target holographic image illumination distributions as input to produce estimated complex optical fields as output.

19. The system of claim 11 the CNN is trained using a user-specified cost function that measures dissimilarity between target holographic image illumination distributions and simulation results.

20. A non-transitory computer readable medium having stored thereon executable instructions that when executed by a processor of a computer control the computer to perform steps comprising:

providing a target holographic image illumination distribution as input to a trained convolutional neural network (CNN);

generating, using the trained CNN, a predicted complex optical field in an image plane located downstream along an optical axis from a spatial light modulator;

back propagating the complex optical field to a spatial light modulator plane to yield a predicted spatial light modulator phase mask; and configuring the spatial light modulator using the phase mask so that the spatial light modulator will modulate incident light using the phase mask and produce a holographic image.

21. A non-transitory computer readable medium having stored thereon executable instructions that when executed by a processor of a computer control the computer to perform steps comprising:

providing a target holographic image illumination distribution as input to convolutional neural network (CNN);

generating, using the CNN, a predicted complex optical field in an image plane located downstream along optical axis from a spatial light modulator (SLM);

back propagating the predicted complex optical field to spatial light modulator plane to yield predicted spatial light modulator phase mask;

simulating forward propagation of a simulated light field through a simulated SLM configured with the predicted SLM phase mask and simulated optics to produce reconstructed target image distribution;

evaluating the predicted SLM phase mask using a cost function that generates values based on a comparison between the reconstructed target image distribution and the target holographic image illumination distribution input to the CNN; and providing the values of the cost function and different desired target holographic image illumination distributions as inputs to the CNN, wherein the CNN adjusts its parameters to achieve a desired value or range of values of the cost function.

* * * * *